US012281514B2

(12) United States Patent
Stern et al.

(10) Patent No.: US 12,281,514 B2
(45) Date of Patent: Apr. 22, 2025

(54) DOOR SYSTEM AND MODULE THEREFORE

(71) Applicant: Y.STERN ENGINEERING (1989) LTD., Yavne (IL)

(72) Inventors: Yosef Stern, Bitzaron (IL); Yuval Stern, Ramot Meir (IL)

(73) Assignee: Y.STERN ENGEENIRING (1989) LTD., Yavne (IL)

( * ) Notice: Subject to any disclaimer, the term of this patent is extended or adjusted under 35 U.S.C. 154(b) by 0 days.

(21) Appl. No.: 18/010,036

(22) PCT Filed: Jun. 15, 2021

(86) PCT No.: PCT/IL2021/050724
§ 371 (c)(1),
(2) Date: Dec. 13, 2022

(87) PCT Pub. No.: WO2021/225732
PCT Pub. Date: Dec. 23, 2021

(65) Prior Publication Data

US 2023/0228143 A1 Jul. 20, 2023

(30) Foreign Application Priority Data

Jun. 16, 2020 (IL) .......................................... 275425

(51) Int. Cl.
*E05F 15/00* (2015.01)
*E05B 17/10* (2006.01)
(Continued)

(52) U.S. Cl.
CPC .............. *E05F 15/73* (2015.01); *E05B 17/10* (2013.01); *E05B 47/0001* (2013.01);
(Continued)

(58) Field of Classification Search
CPC ...... E05F 15/73; E05F 15/63; E05B 47/0001; E05B 65/0035; E05B 2047/0068; E05Y 2201/216
See application file for complete search history.

(56) References Cited

U.S. PATENT DOCUMENTS 5,647,074 A * 7/1997 White, Jr. ............... E03D 9/002 4/312
8,141,296 B2 * 3/2012 Bem .................. E05B 65/0035 49/340
(Continued)

FOREIGN PATENT DOCUMENTS

CA 2637110 A1 10/2009
DE 102012104750 A1 12/2013
(Continued)

OTHER PUBLICATIONS

Article: Touch-Free Toilet Doors, https://www.lookandwave.de/en/home.html, (2022).
(Continued)

*Primary Examiner* — Daniel J Troy
*Assistant Examiner* — Daniel Alvarez
(74) *Attorney, Agent, or Firm* — CANTOR COLBURN LLP

(57) ABSTRACT

A door module for use with a door system, and applications thereof, are disclosed. The door module comprises a door frame and a door articulated to the door frame, a touchless door module comprising a door motor assembly, a door locking assembly, a control assembly and a power source. The door motor assembly can be configured for displacing the door between an open position and a closed position, responsive to a door opening signal or a door closing signal, respectively, emitted from the control assembly. The locking assembly can be configured for displacing a locking bolt between a locked position at which it is engageable with a
(Continued)

locking strike, responsive to a locking signal emitted from the control assembly, and an unlocked position, responsive to an unlocking signal emitted from the control assembly. The control assembly comprises in some embodiments at least one touchless inside sensor, wherein an entrance signal includes a signal received form the at least one inside touchless sensor, resulting in generating a door closing signal and an occupied signal, and an exit signal received by the at least one inside sensor resulting in generating a door opening signal. The control assembly may further comprise a signaling system configured for emitting noticeable door mode indicia responsive to door parameters.

22 Claims, 19 Drawing Sheets

(51) Int. Cl.

| | |
|---|---|
| ***E05B 47/00*** | (2006.01) |
| ***E05B 65/00*** | (2006.01) |
| ***E05F 15/63*** | (2015.01) |
| ***E05F 15/73*** | (2015.01) |
| *E05F 15/79* | (2015.01) |

(52) U.S. Cl.
CPC .......... *E05B 65/0035* (2013.01); *E05F 15/63* (2015.01); *E05B 2047/0068* (2013.01); *E05F 15/79* (2015.01); *E05Y 2201/216* (2013.01); *E05Y 2900/112* (2013.01)

(56) References Cited

U.S. PATENT DOCUMENTS

| | | | | |
|---|---|---|---|---|
| 8,169,317 | B2 | 5/2012 | Lemerand | |
| 8,888,045 | B2 * | 11/2014 | Boren | E05F 15/00 244/129.5 |
| 9,574,389 | B2 * | 2/2017 | Menze | E05B 1/0053 |
| 2009/0300988 | A1 | 12/2009 | Bem | |
| 2010/0253516 | A1 | 10/2010 | Lemerand et al. | |
| 2021/0381296 | A1 * | 12/2021 | Fava | E05B 47/026 |

FOREIGN PATENT DOCUMENTS

| | | | |
|---|---|---|---|
| DE | 102015200228 | A1 | 7/2016 |
| DE | 102015200229 | A1 | 7/2016 |
| EP | 1643065 | A2 | 4/2006 |
| JP | 2010281175 | A | 12/2010 |
| JP | 2017082537 | A | 5/2017 |
| JP | 2017201448 | A | 11/2017 |

OTHER PUBLICATIONS

International Search Report for corresponding application PCT/IL2021/050724 filed Jun. 15, 2021; Mail date Sep. 1, 2021.

Written Opinion for corresponding application PCT/IL2021/050724 filed Jun. 15, 2021; Mail date Sep. 1, 2021.

European Search Report for corresponding application EP21824895; Report dated Jun. 28, 2024.

* cited by examiner

DOOR SYSTEM AND MODULE THEREFORE

TECHNOLOGICAL FIELD

The present disclosure is concerned with a door system. More particularly the disclosure relates to an automated door system, suited for hands-free operation.

BACKGROUND ART

References considered to be relevant as background to the presently disclosed subject matter are listed below:

DE102015200229
DE102015200228
JP2017082537
JP2010281175
DE102012104750
EP1643065
JP2017201448
https://www.lookandwave.de/en Acknowledgement of the above references herein is not to be inferred as meaning that these are in any way relevant to the patentability of the presently disclosed subject matter.

BACKGROUND

DE102015200229 discloses a partition means more partition members the invention also relates to a shower separating a plurality be used, more locker—or sanitary elements in particular on, more door modules, door a motor movable input each being, a clutch door and swivelable, so the door coupled to a drive member which more, between the door movement of the actuator is pivotally, contact by a user wherein the input operable and wherein the coupling for protection of the drive element is formed, member when a blockage of the door is displaced is to be.

DE102015200228 discloses a control module for a cabin, especially for a changing or sanitary cabinet, with a motorized movable drive element, a pivoting door and a coupling device, by which the input member with the door coupled such that the door by a movement is the driving member pivotally, wherein the coupling means comprises a mechanical energy storage, is what arranged in the power flow between the drive element and the door that means the drive element by transmitted mechanical energy is taken up in a blockade of the door in the energy storage. Furthermore, the invention relates to a partition device with at least one partition member for separating several cabins, several particular changing or sanitary cabinet, with such control module.

JP2017082537 discloses a door of a toilet booth is held at an open position by a restorable hinge. A door moving apparatus is provided to move the door to a closed position. The door moving apparatus includes an electric motor that is activated by the signals sent from an operation sensor that is activated by a user in the toilet booth, an arm driving shaft that is driven by the electric motor, and an arm of which one end is connected with the arm driving shaft. The rotation of the electric motor in one direction swings the arm so that the swinging end of the arm pushes the door to the closed position. The rotation of the electric motor in the other direction moves the arm apart form the door and the restorable hinge restores the door to the original open position JP2010281175 discloses a locking device intended for locking and unlocking a toilet door which is installed in the toilet specified so as to be in a door opening state when not in use. The toilet door is closed and locked after the toilet is occupied. For unlocking of the locking device, a human body detecting sensor is allowed to detect an unlocking signal by putting a hand over a predetermined position, and the locking device for use in locking and unlocking the toilet door locking and unlocking which receives the unlocking signal activates an unlocking operation part so as to remove a dead bolt from its receiving part, thereby unlocking the toilet door.

DE102012104750 discloses a device having a sensor device for sensing the presence of a person within a predetermined space region in front of and behind a door. The sensor device is attached to a panel in the vicinity of the door, and designed to generate a signal during a non-contact approach of a human hand, where the signal is provided to activate an electrical motor for opening the door for a predetermined time interval, and for closing the door again after the lapse of the predetermined time interval. The sensor device is formed of a light barrier.

EP1643065 discloses a drive including a drive unit arranged on the door frame or door leaf. The leaf is automatically moved by means of the drive unit. The drive unit includes an electric drive motor for opening and/or closing the door. An independent claim is included for a drive unit for a door drive.

JP2017201448 discloses a toilet monitoring system capable of monitoring a use situation of a toilet booth even when it is applied to any constantly opened type or constantly closed type toilet booth, and making it hard for an out-of-purpose user to avoid monitoring. Operation sensors are provided in a toilet boot. The toilet monitoring system comprises: a door opening/closing device to be operated according as a door closing signal is output from the sensor operated by a user for moving a door to a closing position, and to be operated according as a door opening signal is output from the sensor operated by the user for moving the door to an opening position; and a monitoring device for, when the door is moved to the closing position on the basis of the door closing signal, receiving use start information from the door opening/closing device, and for, when the door is moved to the opening position on the basis of the door opening signal, receiving use end information from the door opening/closing device, and for, on the basis of the use start information and the use end information, monitoring a use situation of the toilet booth.

GENERAL DESCRIPTION

According to an aspect of the disclosure there is a door system comprising a door frame and a door articulated to the door frame, and a touchless door module comprising a door motor assembly, a door locking assembly, a control assembly and a power source;

- the door motor assembly is configured for displacing the door between an open position and a closed position, responsive to a door opening signal or a door closing signal, respectively, emitted from the control assembly;
- the locking assembly is configured for displacing a locking bolt between a locked position at which it is engageable with a locking strike, responsive to a locking signal emitted from the control assembly, and an unlocked position, responsive to an unlocking signal emitted from the control assembly;
- the control assembly comprises at least one inside sensor, wherein an entrance signal includes a signal received form the at least one inside sensor, resulting in generating a door closing signal and an occupied signal; and an exit signal received by the at least one inside sensor resulting in generating a door opening signal;

the control assembly further comprises a signaling system configured for emitting noticeable door mode indicia responsive to door parameters; and wherein the at least one inside sensor is a touchless sensor.

According to a particular embodiment the control assembly further comprises at least one outside sensor, wherein an entrance signal includes a first signal received from the at least one outside sensor and a sequential second signal received form the at least one inside sensor, resulting in generating a door closing signal and an occupied signal; and an exit signal received by the at least one inside sensor resulting in generating a door opening signal;

and wherein the at least one outside sensor is a touchless sensor.

According to another aspect of the disclosure there is disclosed a touchless door module for use with a door system comprising a door frame and a door articulated to the door frame; the touchless door module comprising a door motor assembly, a door locking assembly, a control assembly and a power source;

the door motor assembly is configured for displacing the door between an open position and a closed position, responsive to a door opening signal or a door closing signal, respectively, emitted from the control assembly;

the locking assembly is configured for displacing a locking bolt between a locked position at which it is engageable with a locking strike, responsive to a locking signal emitted from the control assembly, and an unlocked position, responsive to an unlocking signal emitted from the control assembly;

the control assembly comprises at least one inside sensor, wherein an entrance signal includes a signal received form the at least one inside sensor, resulting in generating a door closing signal and an occupied signal; and an exit signal received by the at least one inside sensor resulting in generating a door opening signal;

the control assembly further comprises a signaling system configured for emitting noticeable door mode indicia responsive to door parameters; and wherein the at least one inside sensor is a touchless sensor.

According to an embodiment of this aspect, the control assembly further comprises at least one outside sensor, wherein an entrance signal includes a first signal received from the at least one outside sensor and a sequential second signal received from the at least one inside sensor, resulting in generating a door closing signal and an occupied signal; and an exit signal received by the at least one inside sensor resulting in generating a door opening signal;

and wherein the at least one outside sensor is a touchless sensor.

The door can be fitted to admit touchless access into any confined space, at any site, such as a toilet cabin, a bathroom, a clean room of any type, etc.

The arrangement is such that the an individual can access a confined space fitted with a door system or a touchless door module according to the disclosure without having to touch any element thereof, such as a door handle, door knob, door lock, etc., wherein the door opens upon sensor activation by the individual, then closes behind the individual upon sensor activation and again the door will open upon demand upon sensor activation by the individual. This arrangement thus is useful in preventing, or reducing to minimum, the possible contamination that may be otherwise transferred between individuals upon touching commonly used elements. A door entrance fitted with a door system according to the present disclosure thus facilitates an individual to open a door for entry into a confined space, then have the door close behind him as he is within the confined space, and have the door open again, at demand, for the individual to exit the confined space, all of which takes place automatically without having to touch any portion of the door system. The door system is configured for indicating an actual situation of the door system and optionally there is an override mechanism for manipulating the system.

The arrangement is further such that the door will open to admit access into the confined space providing the door is in operative state and that the confined space is ready for use by the individual.

The door system and the touchless door module according to the present disclosure can be configured for retrofit in existing locations, by replacing the entire door and frame or by replacing only selected components of the door system.

Touchless sensors can be one or more sensors that do not require actual users' contact therewith, and configured for emitting a signal responsive to an external signal picked-up, e.g. proximity sensors such as an IR sensor, an RFID sensor, an NFC sensor, a magnetic sensor, an optical/light sensor, an image-recognition sensor (e.g. face recognition), an ultrasonic sensor, a voice/sound recognition sensor, etc.

Any one or more of the following features, designs and configurations can be applied to a door system and a door module according to any aspect of the present disclosure, separately or in various combinations thereof:

The door system and touchless door module can further comprise at least one door position sensor and wherein the locking signal is generated upon sensing a closed position generated by the at least one door position sensor;

Communication between the door system components can be through wireless communication or wiring extending between the respective system components;

The door system can further comprise a communication module configured for transmitting data regarding door parameters to a remote location;

The locking assembly can comprise a manual override mechanism, configured for manipulating the locking assembly between its respective positions;

The manual override mechanism can be configured at any one or both of the inside and outside of the door assembly;

The manual override mechanism can be accessible for manual manipulation from an inside and an outside of the door system;

The door motor assembly can be disposed at either an inside or an outside of the door;

The door motor assembly can be fitted within the door or within the door frame;

The door motor assembly can comprise a motor unit fixed to one of the door and the frame, with a respective manipulating member extending from the motor unit to the other one of the door and the frame;

The door motor assembly can be of any type. For example, the door motor assembly can be an electric motor, a hydraulic or a pneumatic motor, etc.;

The door motor assembly can comprise a clutch mechanism configured to discontinue displacing the door between its respective position at the event of an obstacle disposed at the door's path of displacement;

The door motor assembly can be configured with sensing for determining motor position and transmitting motor indicia to the control assembly;

Signaling the electric motor assembly can be facilitated by electric current emitted from the control assembly, stimulating operation thereof;

The power source can be a DC or an AC power source;

The locking assembly can be configured at the lock jamb or at the lock stile;

The control assembly can be configured at the lock jamb or at the lock stile;

The locking assembly and the control assembly can be integral or separated from one another;

The locking assembly and the control assembly and all sensors can be integrated in a unitary door module;

The unitary door module can be fitted a lock jamb of the door system;

The door can be of any type. For example, the door can be a slab/hinged door, any type of sliding door, a rotating/revolving door, etc.;

The door can be a slab door configured for opening into the confined space or away therefrom;

Where the door opens away from the confined space than the locking signal can be emitted by a time relay, configured for closing the door after a predetermined time has lapsed from the door opening signal;

The door can comprise one or more door panels;

The door assembly can be configured with a fee charging module, wherein the door will open conditional to fee transmittal;

Fee transmittal of the fee charging module can be collected by at site payment (e.g. coins, notes, NFC transfer, credit card payment, etc.) or by a pre-paid arrangement;

The door mode indicia can be one or both of audio indicia and visible indicia;

The door mode indicia can be displayed at either or both of an outside and an inside of the door;

The door mode indicia can be a light emitting signal displayable at a door handle height;

Door mode indicia can include indications relating to one or more of the following indications: door is open; door is closed, locking assembly is locked, locking assembly is unlocked, door closed but unlocked, locking bolt disturbed, door motor disturbed, confined space is occupied, power source error, communication error, system malfunction, service required, access denied, number of use sequences, door system has been used a predetermined number of times;

The door mode indicia can provide alert indicia while displacing between respective open position and closed position;

Door parameters can include indications relating to one or more of the following indications: door is open; door is closed, locking assembly is locked, locking assembly is unlocked, door closed but unlocked, locking bolt disturbed, door motor disturbed, confined space is occupied, power source error, communication error, system malfunction, service required, access denied, number of use sequences, door system has been used a predetermined number of times;

The door system can be configured such that at a standby position, i.e. when the confined space is unoccupied, the door can be normally closed or normally open;

At a configuration devoid of an outside sensor, the door system can be configured such that the at a standby position the door is normally open;

At a normally standby position the door can be at a closed, unlocked position;

At a normally standby position the door motor assembly can be disconnected, so as to facilitate opening the door manually;

When the door is closed at a standby position the locking assembly can be locked;

At a service position the door can be disposed at the closed and locked position; and wherein unlocking the locking assembly is facilitated for authorized individuals;

The unlocking signal can be configured to distinguish authorization for entry into the confined space to particular individuals or groups;

Servicing the system can be for attending to sanitary issues such as cleaning the confined space, refurbishing sanitary and hygiene materials such as soap, disinfectant material, toilet paper, personal sanitary items, or for cleaning and/or disinfecting the confined space or articles therein, or for servicing the door system or its components;

A locking strike can be integral with or integrated with a lock stile of the door or with a lock jamb of the door frame;

The locking bolt of the locking assembly can be a dead bolt or latch bolt;

The door system can be configured with an external knob, said external knob comprising one or both of the outside sensor and an outside door mode signal emitting system;

The door system can comprise an occupied sensor configured to sense the presence of an individual within the confined space and generate a respective occupied signal;

The occupied sensor can be configured at inside face of the door;

The controller can be configured such that it does not open as long as an occupied signal is received;

A timer can be configured for generating a door closing signal for closing the door after a predetermined time has lapsed from a proceeding signal;

The timer can be configured for closing the door after a predetermined time has lapsed from receiving a signal from an inside signal;

The timer can be configured for closing the door after a predetermined time has lapsed from a signal indicating the door has opened.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 5A to 5H are directed to the door locking assembly and control assembly of the door system of the disclosure; wherein:

FIG. 5A is a perspective inside left side view of the assembly;

FIG. 5B is a perspective inside right side view of the assembly, at an unlocked position;

FIG. 5C is an outside view of FIG. 5B;

FIG. 5D is the same as FIG. 5B, with a cover plate removed for clarity;

FIG. 5E is the same as FIG. 5C, with a cover plate removed for clarity;

FIG. 5F is a planar outside view of the assembly, with a cover plate removed, at a locked position;

FIG. 5G is an inside enlarged view of the control assembly;

FIG. 5H is an outside enlarged view of the control assembly;

DETAILED DESCRIPTION OF EMBODIMENTS

Figure 1:
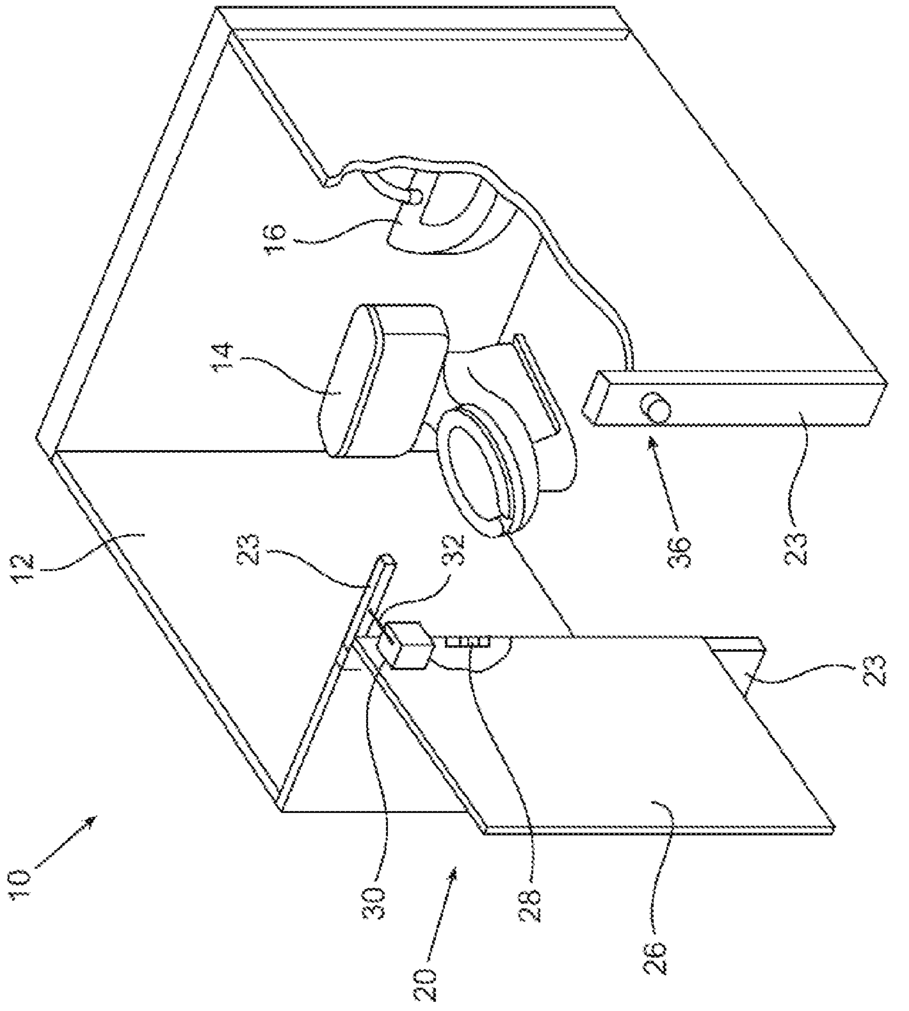
FIG. 1 is a schematic representation of an enclosed space, namely a toilet cabinet, configured with an outwards opening door system, according to an example of the disclosure.

Attention is first directed to FIG. 1 of the drawings schematically illustrating a lavatory generally designated 10, defining a confined space 12 accommodating a toilet 14 and a sink 16, said confined space comprising an outwardly open slab door system 20 (also known as a hinged door), according to the present disclosure.

The door system 20 comprises a door frame 23 (only portions thereof are seen) and a door 26 hingedly articulated to the frame over hinges (one hinge 28 is seen), a door motor assembly 30 is fixed at a top inside portion of the door 26 and is articulated to the frame 23 via a lever 32, a door locking assembly with an integrated control assembly generally designated 36 is fitted within the door 26 at the lock stile thereof, and a power source by way of electric wiring (not shown) extending within the walls of the lavatory 10, supplying power to the a door motor assembly 30 and the integrated door locking assembly and control assembly 36.

It is noted that in the annexed drawings power transfer wiring and signaling and sensing communication are not illustrated. However, all components of the door system and the door module are connected to one another for transfer of power, communication and signals by wire communication or wireless communication.

A detailed description of the components of the door system 20 and features and embodiments thereof will be disclosed hereinafter with reference to the remaining drawings.

It is appreciated that the door system can be an entrance port to any type of confined space, where hygiene and control are admittance control are required, and further it is appreciated that the door can be of any type as well.

Figure 2B:
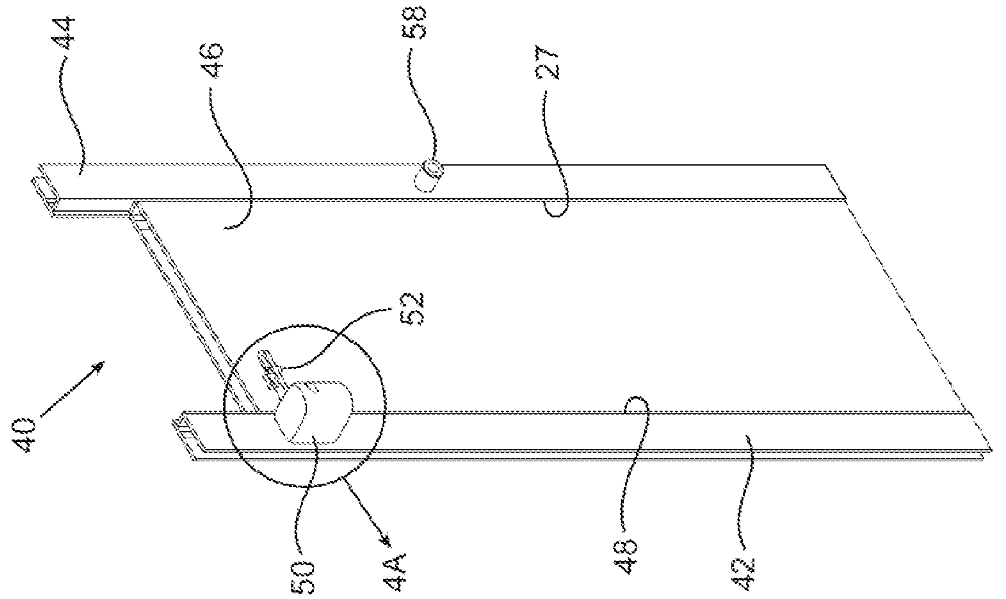
FIG. 2B is an inside perspective view of the door system of FIG. 2A.
Figure 2A:
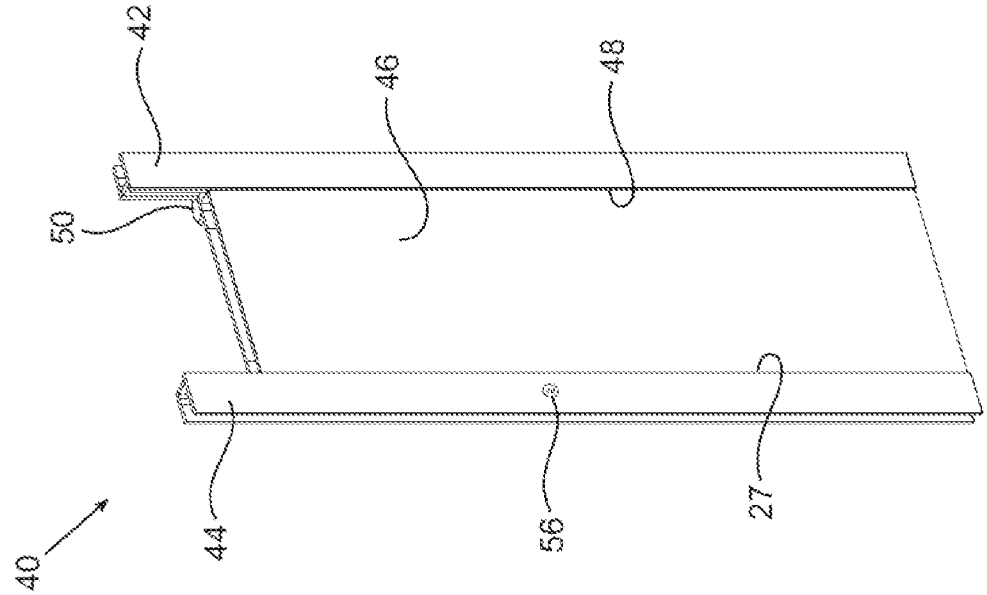
FIG. 2A is an outside perspective view of a door system according to an example of the disclosure, the door being an inward opening slab type door, illustrated at a closed position, with a locking assembly configured at the lock stile.

In FIGS. 2A to 2D there is illustrated a hinge-type door generally designated 40 comprising a frame having a hinge jamb 42 and a lock jamb 44, with a door panel 46 hinged at the hinge stile 48 to the hinge jamb 42. A door motor assembly 50 (seen in further detail with reference to FIGS. 4A to 4D) is secured at a top inside portion of the hinge jamb 42 and is articulated via a door manipulating link 52 to a top inside portion of the door 46. In FIGS. 2A and 2B the door is closed and in FIGS. 2C and 2D the door is open (this is an inside opening door). A mortise type lock door locking assembly is fitted within the lock stile 27, integrated with a control assembly, as will be discussed herein after in greater detail, giving rise to unitary door module generally designated 55, comprising an outside plate panel 56 and an inside knob panel 58.

Figures 2C, 2D:
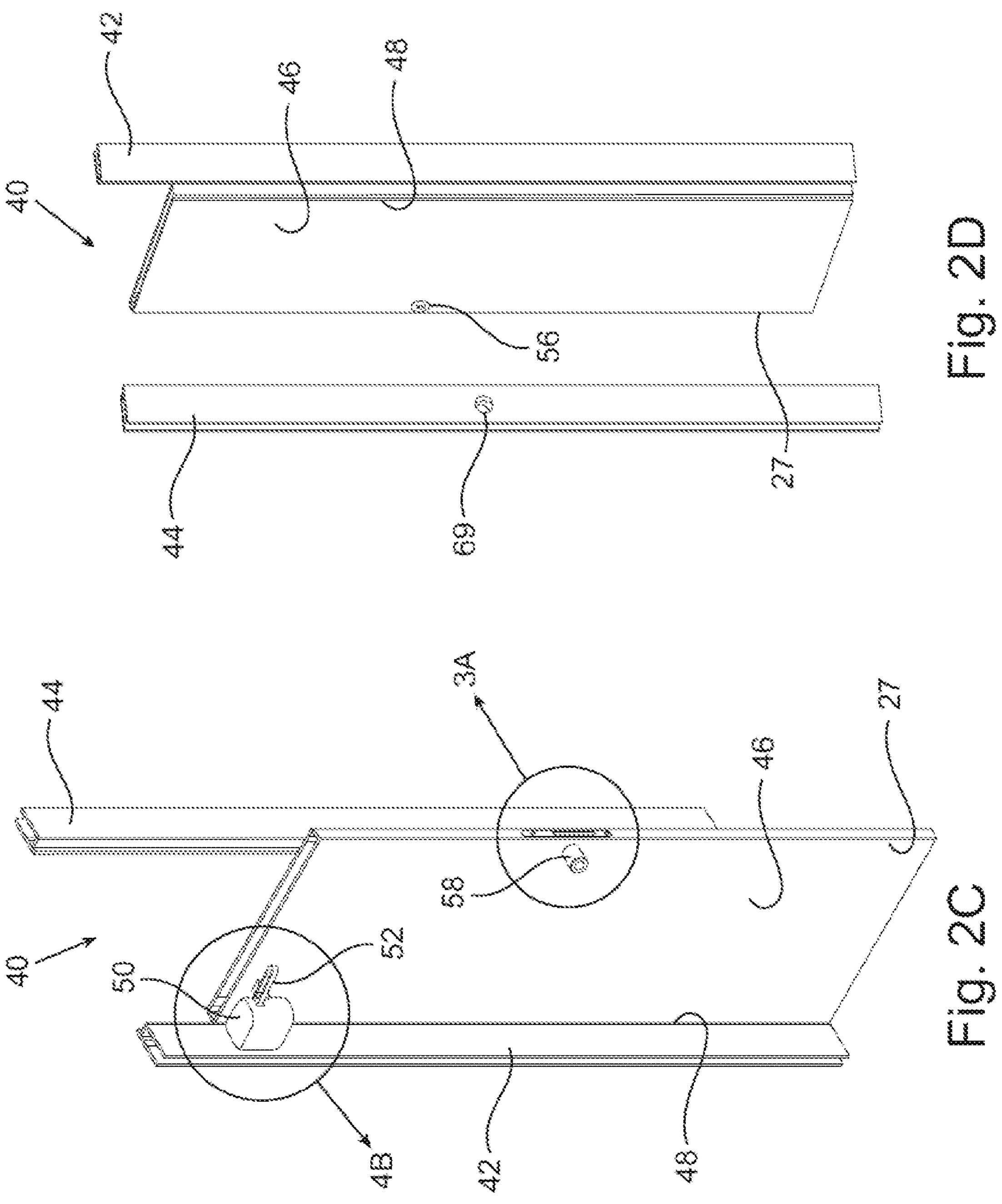
FIG. 2C is an inside perspective view of the door system of FIG. 2B, with the door open.
FIG. 2D is an outside perspective view of the door system of FIG. 2C.
Figure 3B:
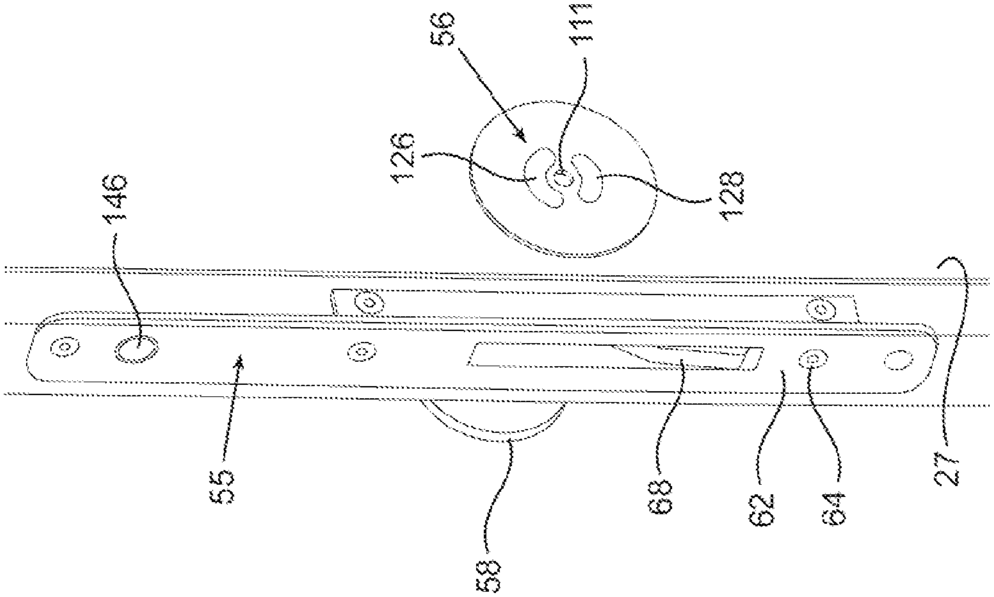
FIG. 3B is an outside view of the portion shown in FIG. 3A.
Figure 3A:
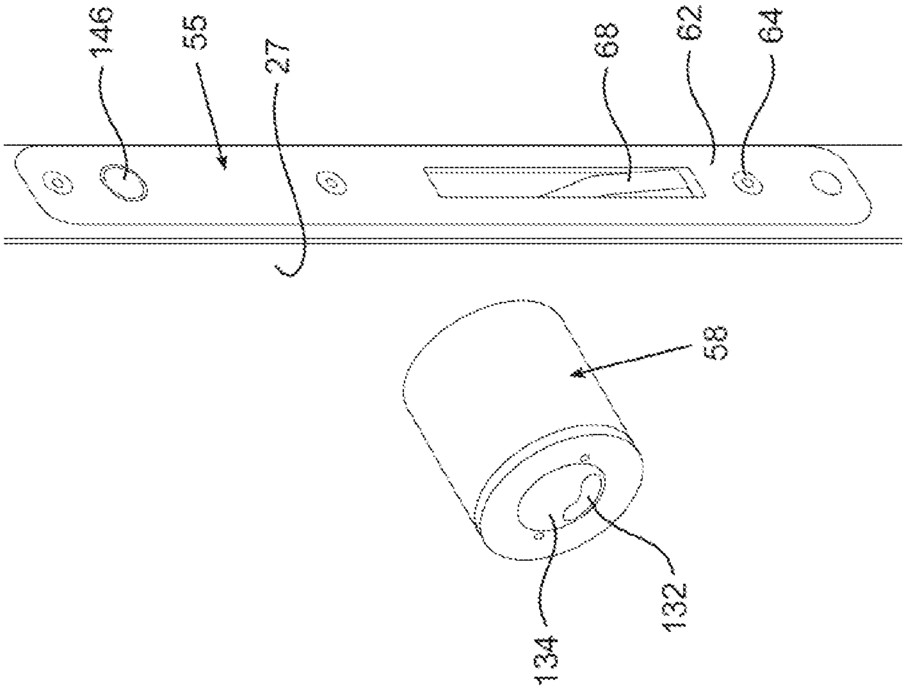
FIG. 3A is an enlargement of the portion marked 3A in FIG. 2C.
Figure 7B:
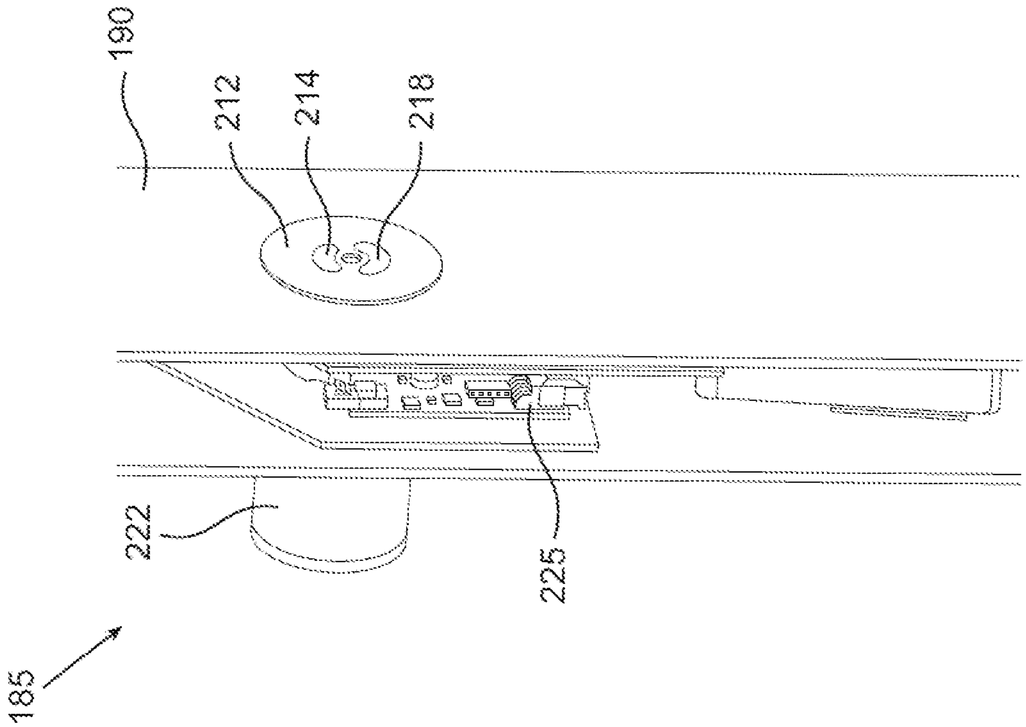
FIG. 7B is an outside view of the portion shown in FIG. 7A.
Figure 7A:
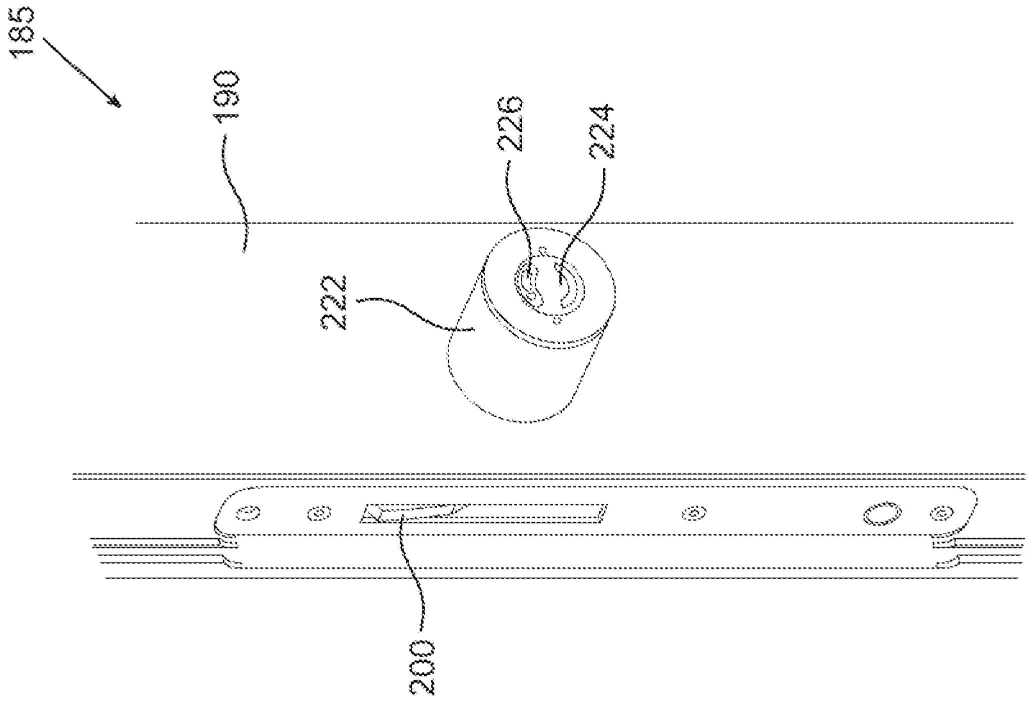
FIG. 7A is an enlargement of the portion marked 7A in FIG. 6C.

As seen in FIGS. 3A and 3B the door module 55 has a faceplate 62 secured to the side edge of the lock stile 27 by bolts 64, and comprises a deadbolt 68 (retracted, unlocked in FIGS. 3A and 3B), however configured for displacing into a projecting locked position (e.g. in FIG. 7), and configured for locking articulation within a strike plate 69 fitted oppositely in register at the lock jamb 44 (FIG. 2D).

Further attention is directed to FIGS. 4A to 4D directed to the door motor assembly 30. Whilst the present example illustrates an electric motor fitted at an inside of the door frame over hinge jamb 42, it is appreciated that in fact any type of motor can be used for displacing the door between its respective open position and closed position. For example, the motor can be fitted to the frame externally, or over the door, or within the door or door frame. Likewise, displacing of the door can be facilitated by a lever/arm (52 in the Figs.) or by other transmission arrangements.

Figure 4B:
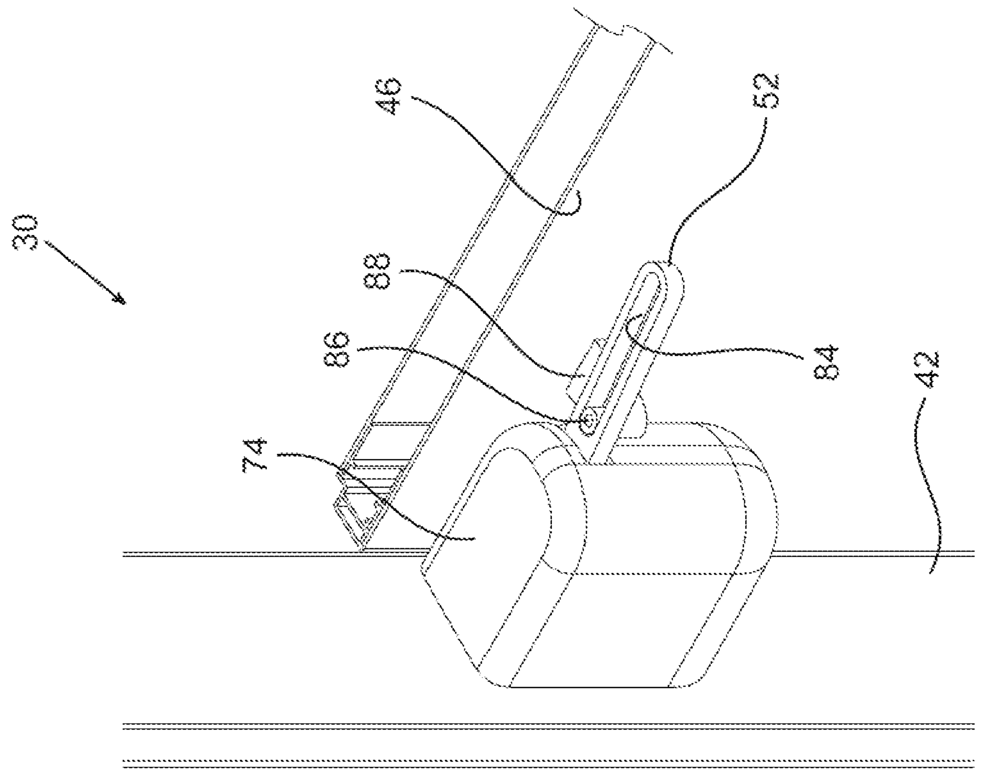
FIG. 4B is an enlarged view of the portion marked 4B in FIG. 2C, illustrating the door motor assembly at an open door position.
Figure 4A:
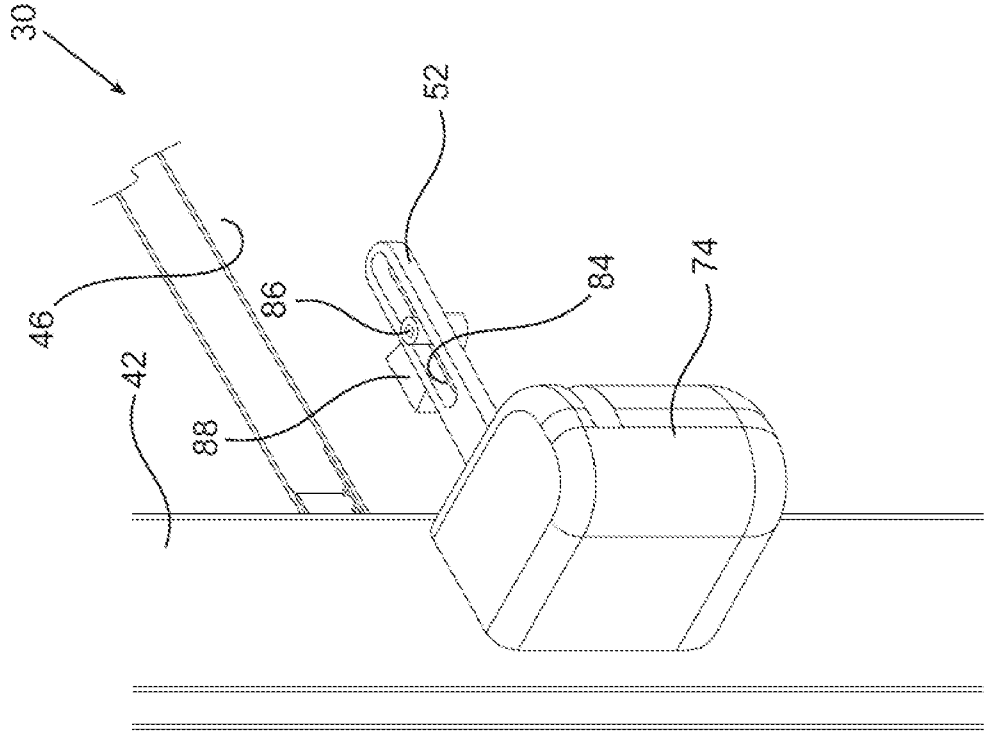
FIG. 4A is an enlarged view of the portion marked 4A in FIG. 2B, illustrating the door motor assembly at a closed door position.
Figure 4C:
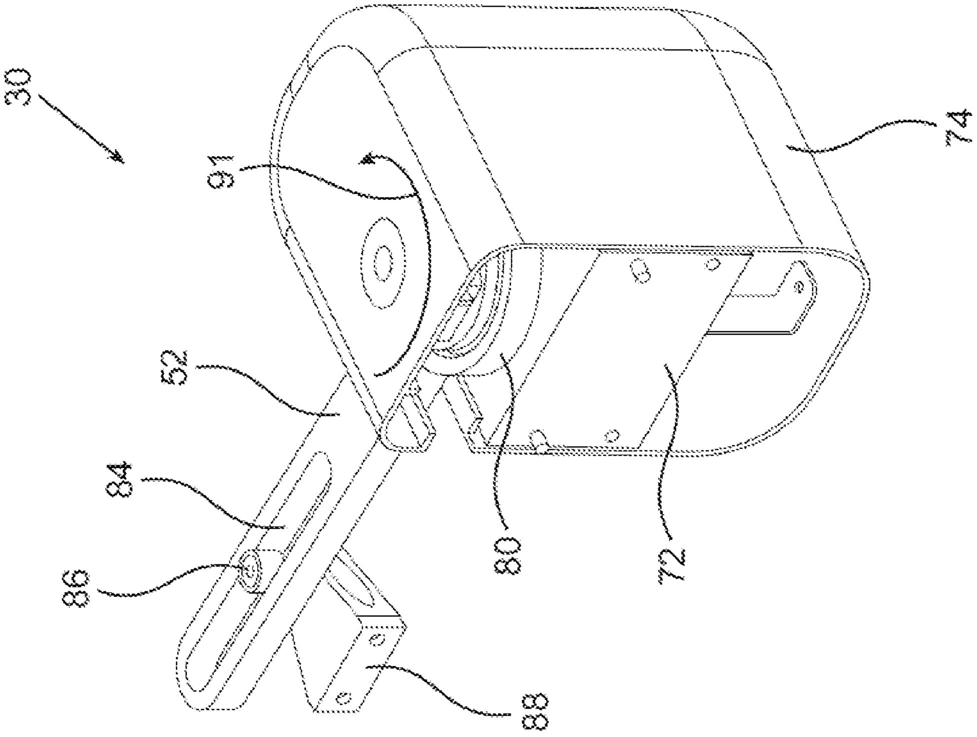
FIG. 4C illustrates an opposite side of the door motor assembly.
Figure 4D:
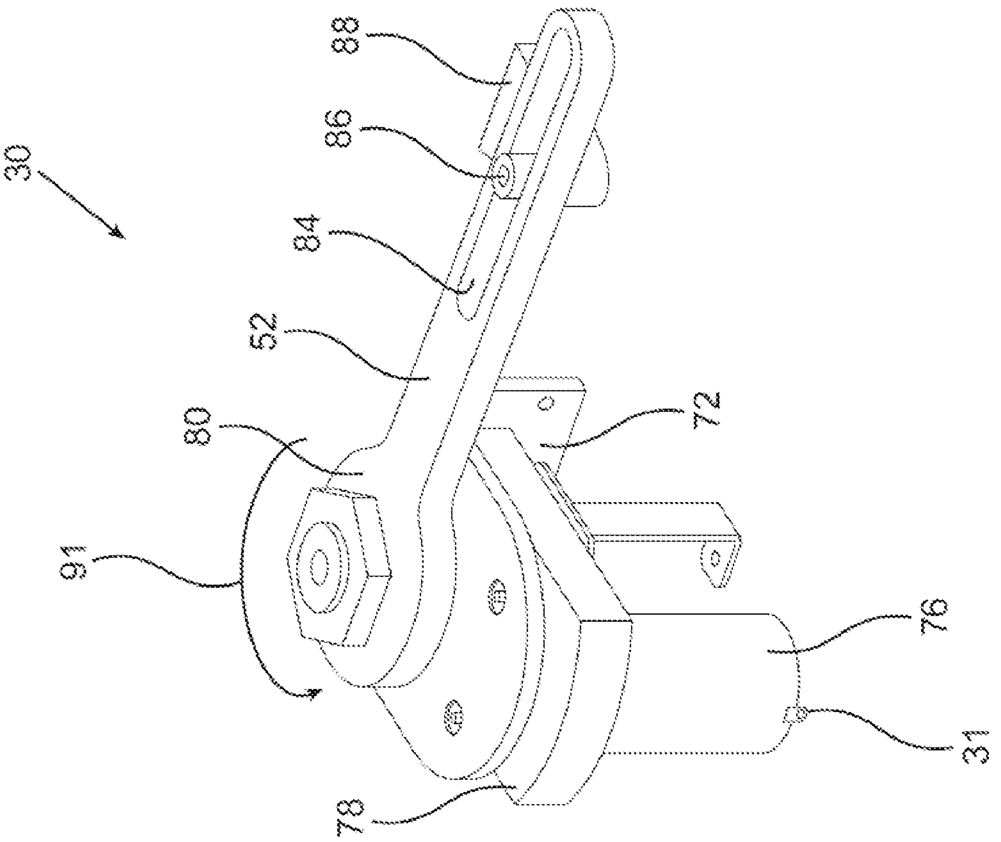
FIG. 4D illustrates the door motor assembly with a cover thereof removed for clarity.

The door motor assembly 30 has a mounting plate 72 for attaching to the hinge jamb 42, and a cover 74, removed in FIG. 4D, exposing the electric motor 76 and an integrated gear and clutch unit 78 configured for angular displacing a shaft 80 to which the lever 52 is firmly secured. The lever 52 is in turn configured with a longitudinal recess 84 slidingly accommodating a follower pin 86 secured to the inside of the door by a mounting plate 88. Smooth rolling, almost frictionless and silent displacement of the follower pin 86 within the longitudinal recess 84 is facilitated by a bearing or proper choice of materials.

The arrangement is such that angular displacement of the shaft 80 in counter clock wise direction (as arrow 91 in FIGS. 4D and 4C) entails displacement of the follower pin 86 within the longitudinal recess 84 and corresponding displacing of the door 46 into the closed position (FIGS. 2A, 2B, 4A, 4C and 4D), whilst angular displacement of the shaft 80 in an opposite direction entails opening the door 46, respectively (FIGS. 2C, 2D and 4B).

Not seen, the door motor assembly 30 is connected at 31 (FIG. 4D) to electric power supply (AC or DC, depending on motor type, a battery can be configured within the door or door frame, or electric wiring can extend therethrough). Alternatively, if the motor is pneumatic or hydraulic respective power line is coupled to the motor. The door motor assembly 30 receives a door opening signal or a door closing signal from the control assembly within door module 55, as will be discussed later, wherein signaling can be transferred by wire or wireless communication, e.g. Bluetooth communication, RF communication etc. However, signaling the electric motor 76 can be facilitated by electric current stimulating operation thereof. The door motor assembly 30 can be configured with a sensor for determining motor position (e.g. angular position) and transmitting motor indicia to the control assembly.

As already mentioned before, whilst not illustrated in the drawings, it is appreciated that all components of the door system and the door module are connected to one another for transfer of power, communication and signals by wire communication or wireless communication.

The integrated gear and clutch unit 78 is provided for reaching an appropriate rotation speed of the shaft 80 and the clutch ensures that the motor 76 disengages from the shaft (or skips transfer by sliding) at the event of the door being obstructed, e.g. by an individual at the door path or any other obstacle or malfunction, so as to prevent injury and damage. The arrangement being such that the clutch 78 disconnects the shaft 80 from the motor 76 at a predetermined power threshold.

Figure 5B:
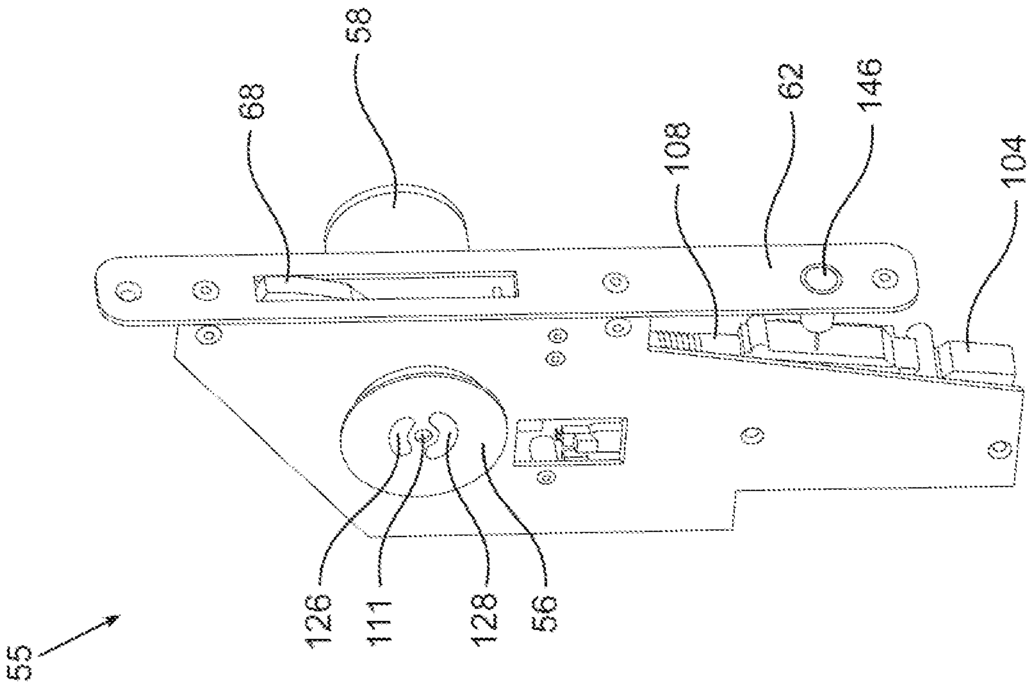
Figure 5A:
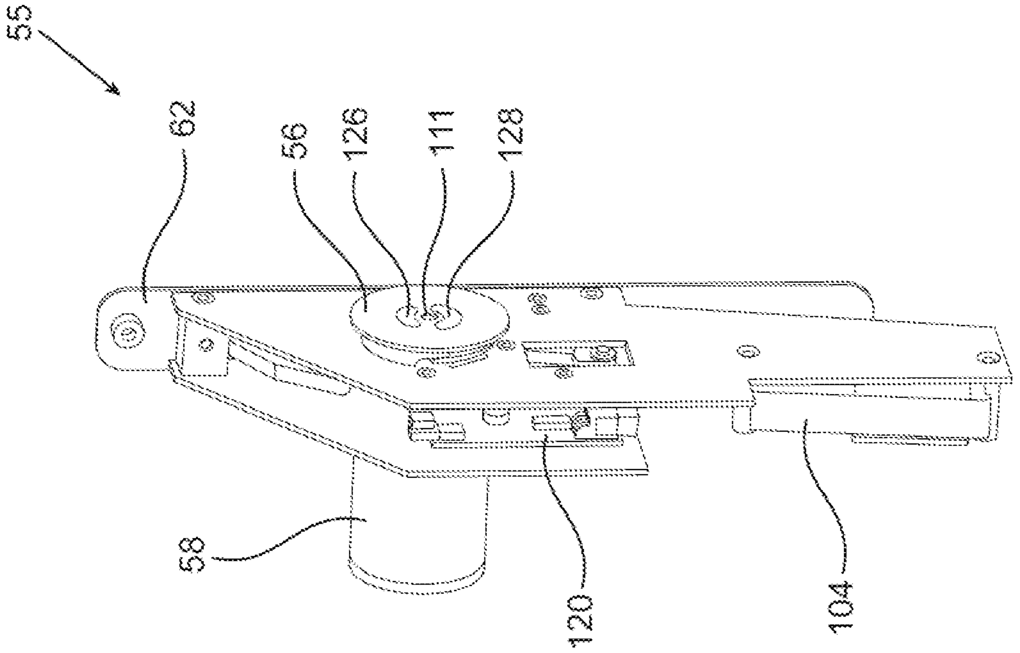
Figure 5D:
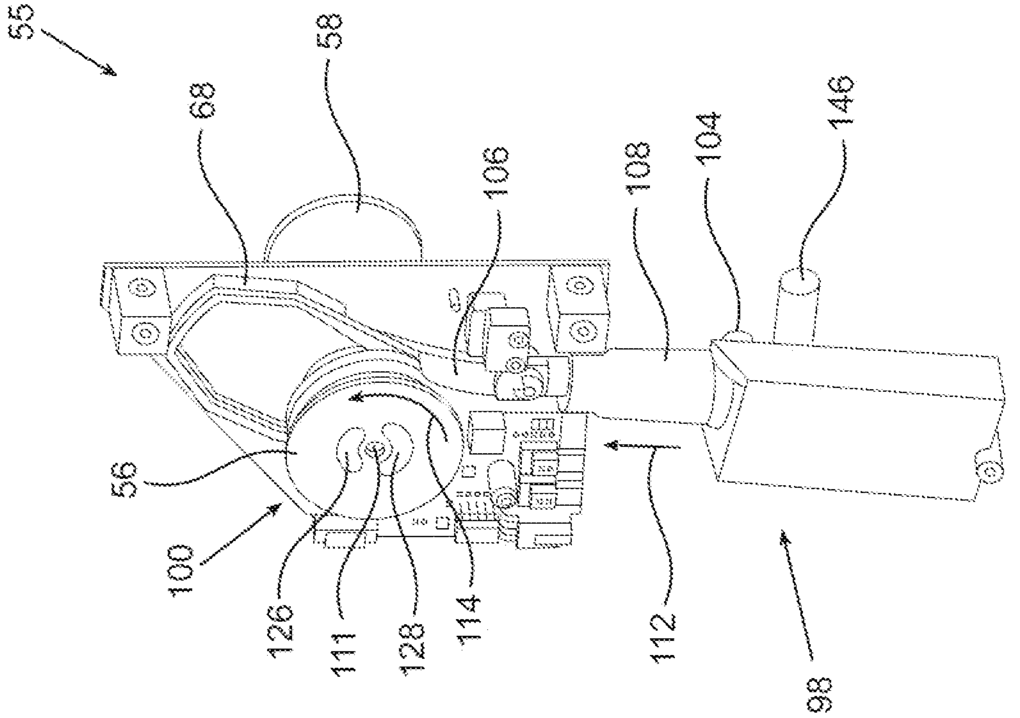
Figure 5C:
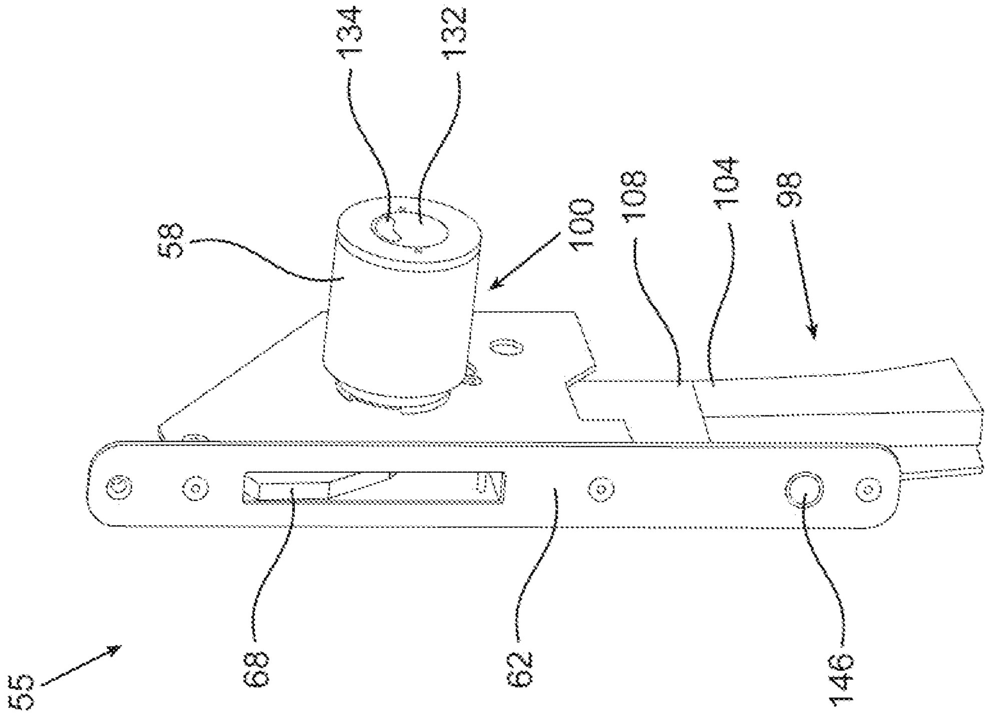
Figure 5F:
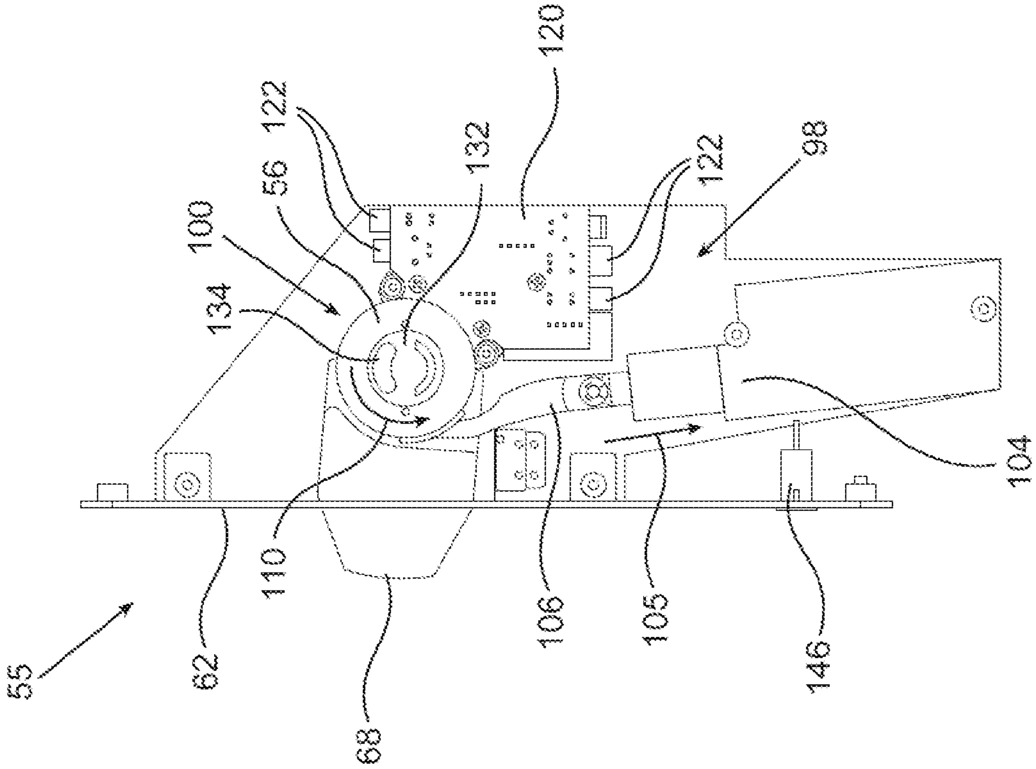
Figure 5E:
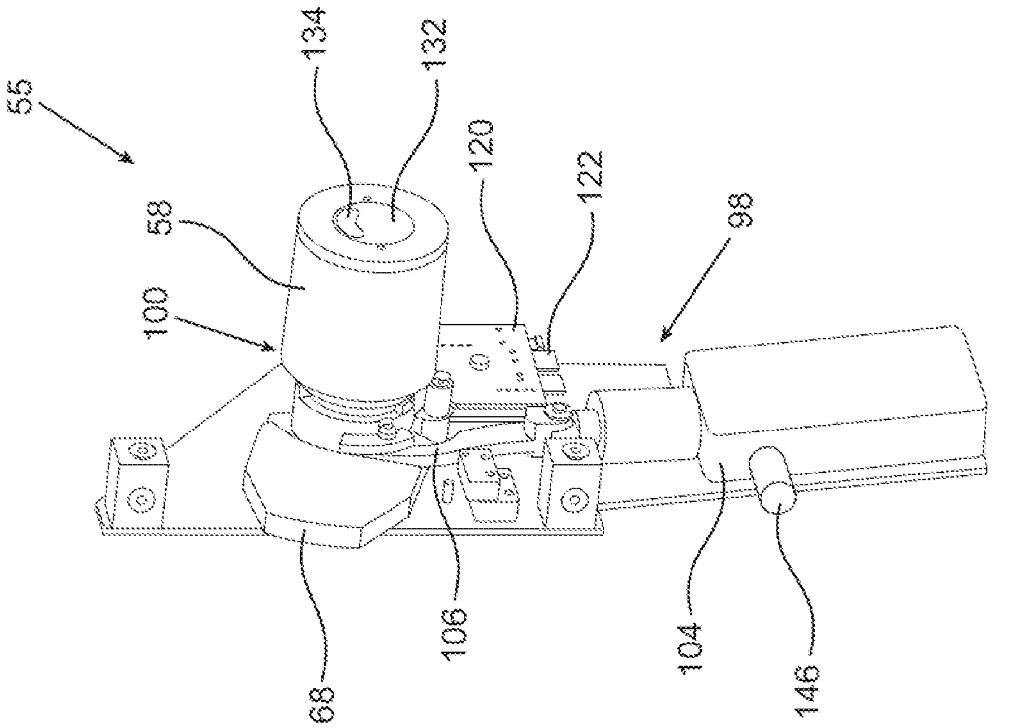
Figure 5H:
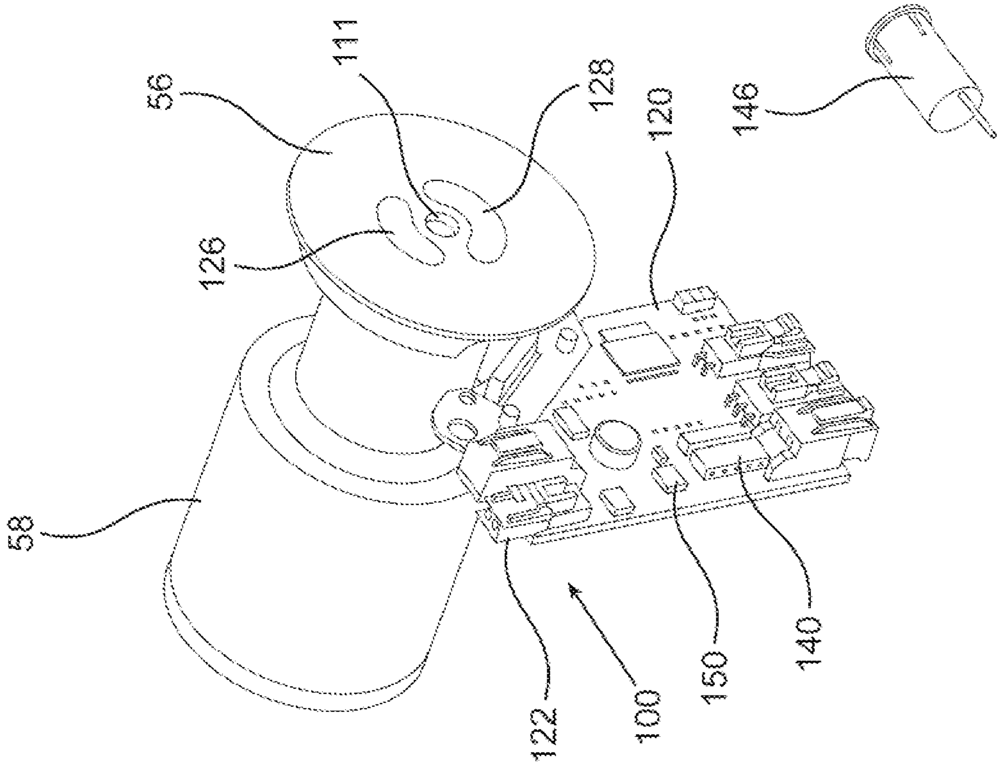
Figure 5G:
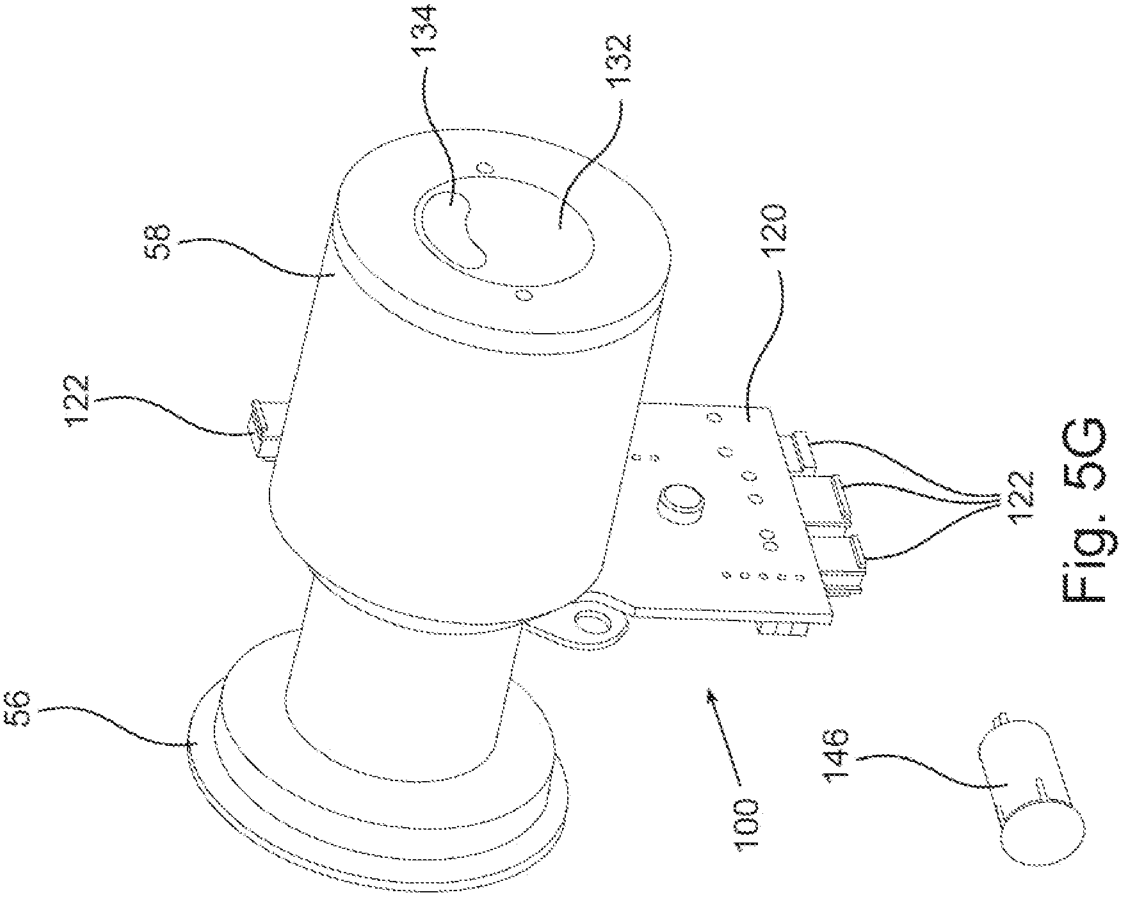
Figure 6B:
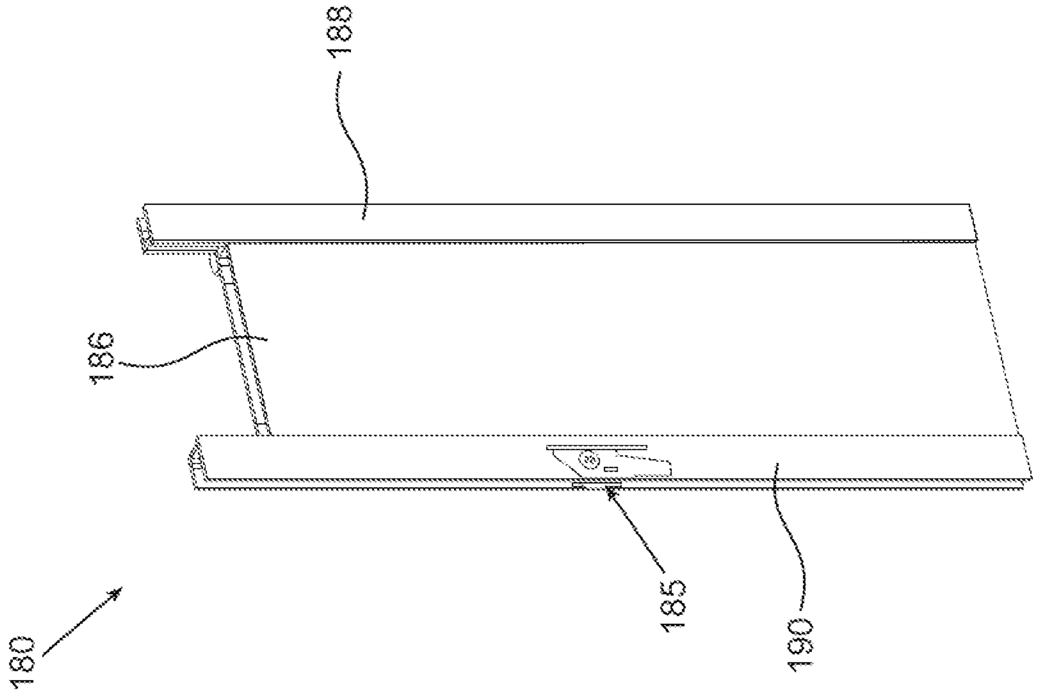
FIG. 6B is an inside perspective view of the door system of FIG. 6A.
Figure 6A:
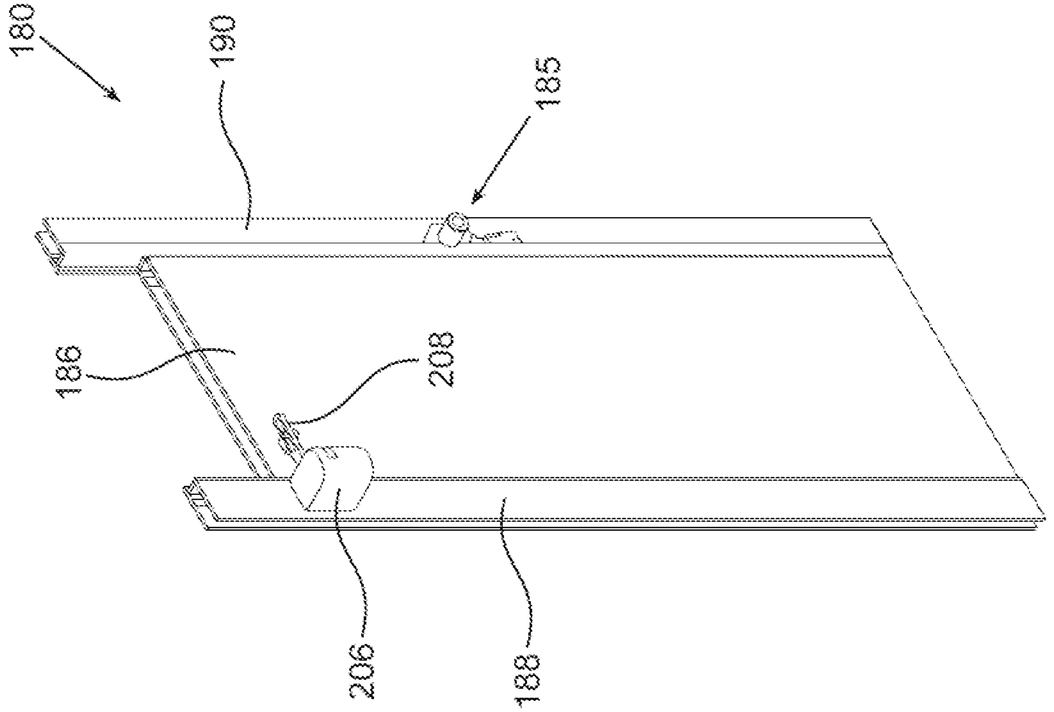
FIG. 6A is an inside perspective view of a door system according to another example of the disclosure, the door being an inward opening slab type door, illustrated at a closed position, with a locking assembly configured at the lock jamb.
Figure 6D:
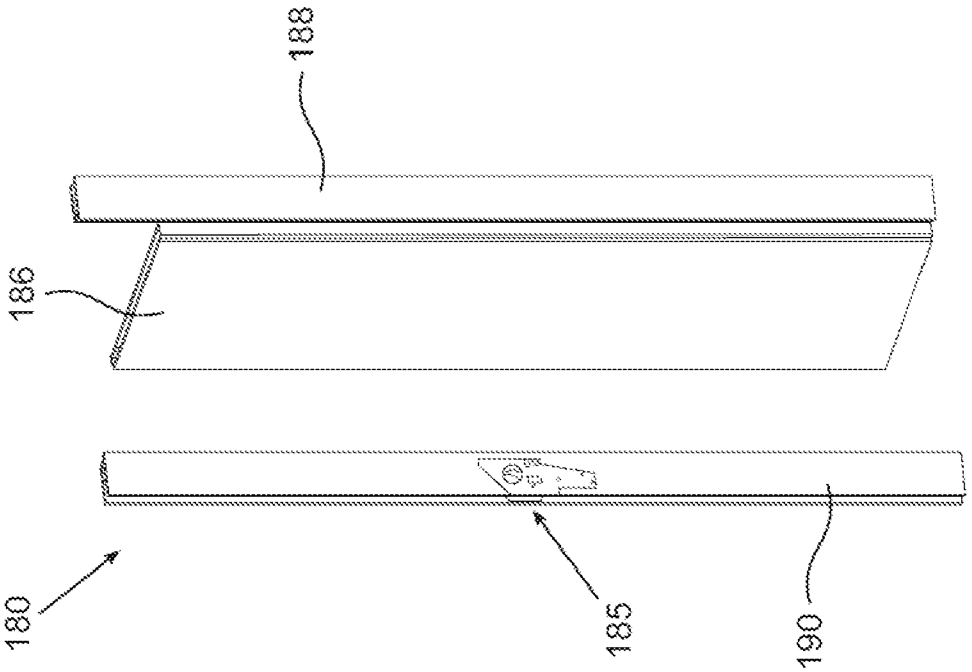
FIG. 6D is an outside perspective view of the door system of FIG. 6C.
Figure 6C:
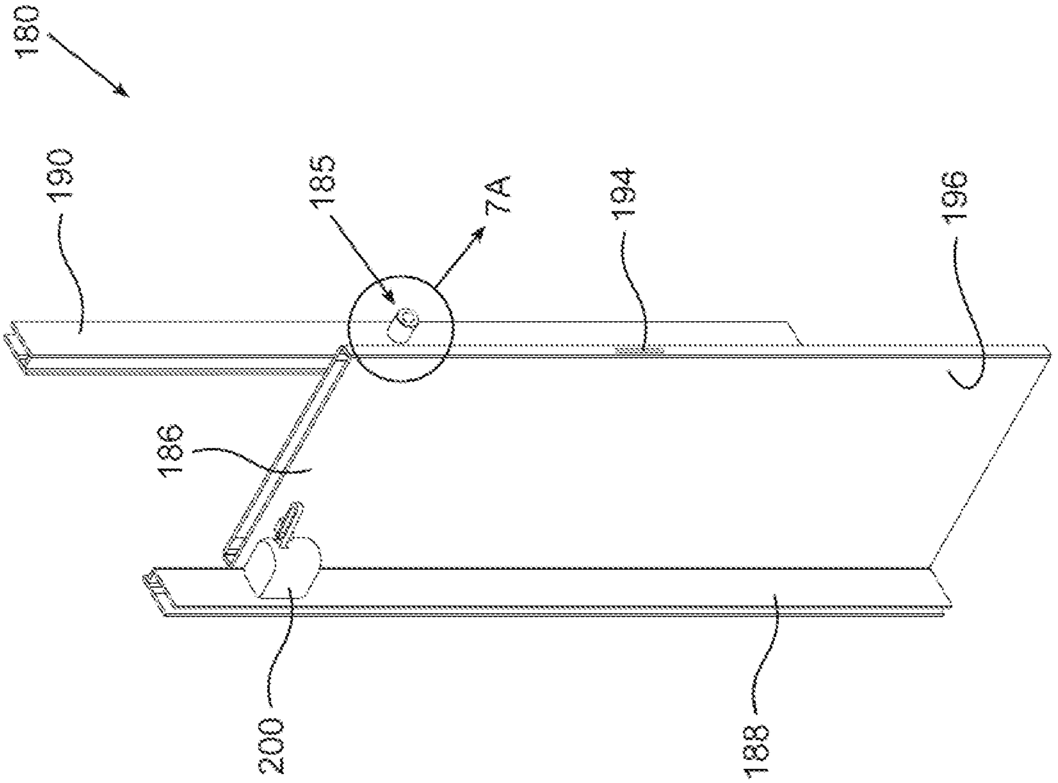
FIG. 6C is an inside perspective view of the door system of FIG. 6A, with the door open.

Turning now to FIGS. 5A to 5H, reference is made to the door module 55, which as mentioned herein before is configured as a mortise type lock and comprises a locking assembly 98 (best seen in FIGS. 5C to 5F) and a control assembly 100 (best seen in FIGS. 5G to 5H). The locking assembly 98 comprises an electric actuator 104 articulated through a hook-shaped coupling link 106 to deadbolt 68, which is pivotally displaceable between a locked position and an unlocked position, responsive to a locking signal/unlocking signal emitted from the control assembly as will be discussed. The arrangement is such that the actuator 104 has an axially displaceable arm 108 which responsive to an electric unlocking signal contracts (along arrow 105 in FIG. 5F) whereby coupling link 106 rotates (in direction of arrow 110 (FIG. 5F), causing the deadbolt 68 to rotate so as to project from the faceplate 62 and engage the strike plate 69 at the respective lock jamb 44. Extracting the axially displaceable arm 108 in direction of arrow 112 (FIG. 5D) results in unlocking, whereby the coupling link 106 rotates in direction of arrow 114, causing the deadbolt 68 to rotate respectively, into its unlocked position, whereby it does not project from the faceplate 62.

The locking assembly 98 further comprises a manual override mechanism, accessible through the outside plate panel 56 for manual manipulation of the locking assembly. This may be required in order to override the electric locking mechanism in case of some malfunction. Thus, the outside plate panel 56 is fitted with a designated shaped (e.g. hexagonal, or slot) key hole 111 so that the locking mechanism can be manually manipulated. Optionally, a manual override mechanism can be configured also at the inside knob panel 58.

The control assembly 100 is configured with a PCB 120 disposed within the door module 55, said PCB comprising several jacks 122 for coupling thereto electric wiring, sensors input and command lines of the door system. At a mounted position the outside plate panel 56 is substantially flush or almost flush with an outside surface of the door. The outside plate panel 56 houses an outside sensor 126 which is a touchless sensor such as an IR sensor, an RFID sensor, an NFC sensor, a magnetic sensor, an optical/light sensor, an image-recognition sensor (e.g. face recognition), an ultrasonic sensor, a voice/sound recognition sensor, etc. The outside sensor 126 is configured for emitting a first signal to the PCB 120, e.g. upon an individual nearing the sensor (touching is not required). Outside plate panel 56 further comprises a signaling system by way of a multicolored led indicator 128, featured for emitting different light signals responsive to different door positions, received from the PCB 120, as will be discussed below. It is appreciated that the signaling system can be configured in different shapes and forms, e.g. by emitting shaped signals, colored signals, audio signals, and combinations thereof.

The inside knob panel 58 projects from the inside door face and accommodates an inside sensor 132 configured for emitting a second signal to the PCB 120 upon sensing an individual at an inside of the door. Knob panel 58 is also configured with a signaling system, by way of a multicolored led indicator 134, featured for emitting different light signals responsive to different door positions, received from the PCB 120, to be discussed below.

The PCB 120 of control assembly 100 is in communication with the door motor assembly 30 either by wire or wireless communication. In addition the control assembly can comprise various features such as a communication module 140 (FIG. 5H) for transferring data regarding door parameters to a remote location, e.g. a service center or a service person. The control assembly 100 comprises a door positioning sensor 146 configured for generating a signal confirming the door is properly closed, so as to confirm true locking upon displacing the locking assembly 98 into the locked position. Yet a feature that can be configured with the system is a fee charging module 150, wherein the door will open conditional to fee transmittal. This may be by a digital transaction (e.g. NFC transfer, credit card payment, etc.) or a coin/note collecting system associated with the door (not shown). The control assembly 100 can be configured with other control and sensing features. For example a timer can be configured for generating a signal such as lock/unlock/door open/door close after a predetermined time has lapsed from a previously picked up command or signal.

Whilst in the example hereinabove the door module 55 is configured as a mortise type element within the lock stile of the door, another example of a door system 180 according to the disclosure is illustrated with reference to FIGS. 6A to 6D, 7A and 7B, wherein the door module 185 is configured within a lock jamb of the door frame.

Accordingly, the door system 180 comprises a door frame comprising in turn a door 186 hingedly articulated to a hinge jamb 188, and a lock jamb 190 accommodating the door module 185, with a strike plate 194 configured at the lock stile 196 of the door 186, in register with a deadbolt 200 of the door module 185. Similar to the previous example, the door system 180 comprises a door motor assembly 206 fixed at a top inside portion of the hinge jamb 188 and articulated to the door 186 via a lever 208, similarly to the arrangement disclosed hereinbefore.

The door module 185, whilst configured within the door frame, is similar with the door module 55 disclosed hereinabove, mutatis mutandis, and reference is made thereto. Accordingly, the door module 185 is substantially flush with an outside of the lock jamb 190 and comprises an outside plate panel 212 housing an outside sensor 214 and a multicolored led indicator 218. Door module 185 is configured at an inside thereof with a knob panel 222, which in turn accommodates an inside sensor 224 configured for emitting a second signal to the PCB 225 upon sensing an individual at an inside of the door. Knob panel 222 is also configured with a signaling system, by way of a multicolored led indicator 226.

Figure 8B:
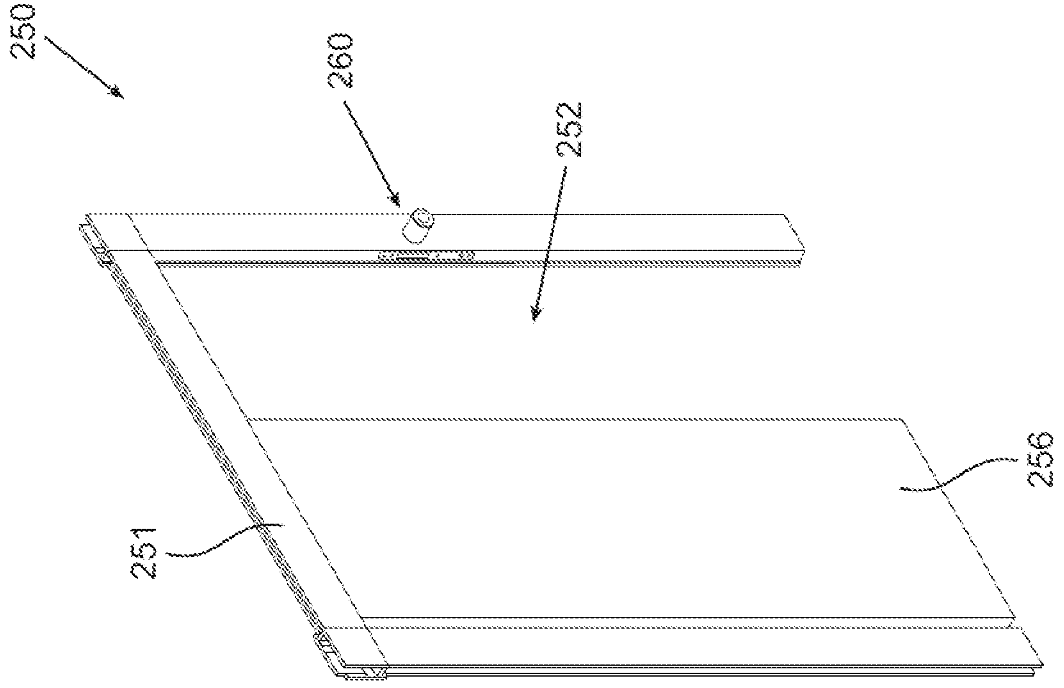
FIG. 8B illustrates the door system of FIG. 8A at an open position.
Figure 8A:
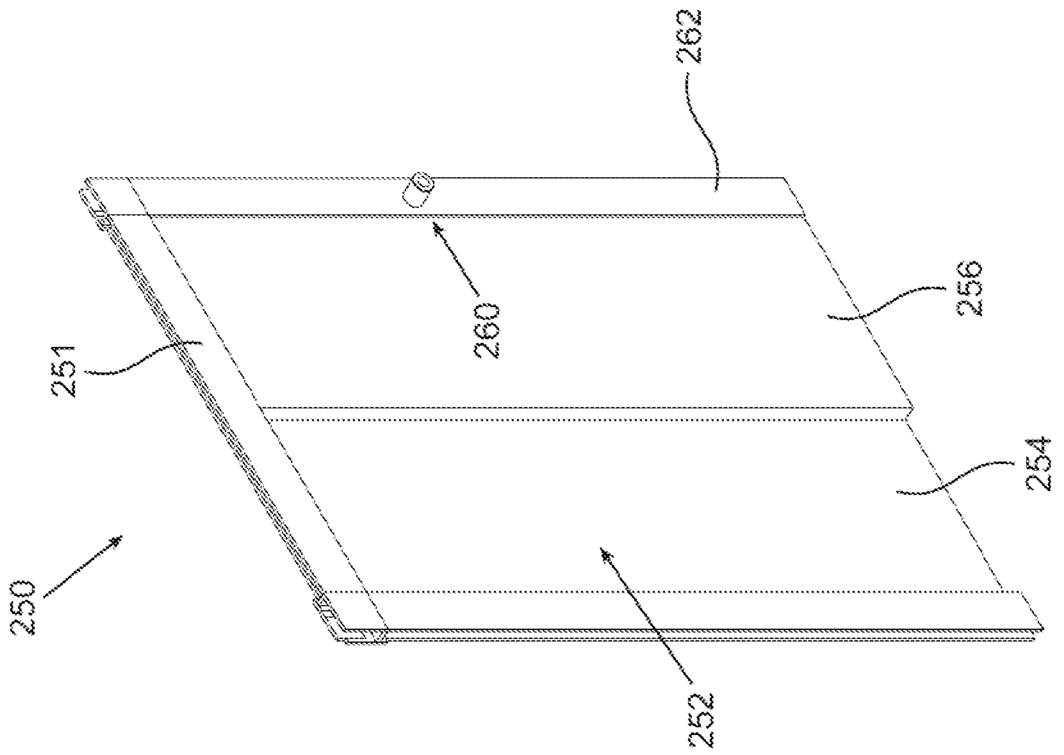
FIG. 8A illustrates yet an example of a door system according to the disclosure, the door being sliding door, illustrated at a closed position.

FIGS. 8A and 8B schematically represent yet a door system 250 according to an example of the disclosure, wherein the door 252 is a sliding door supported by a door frame 251 and comprising a fixed door panel 254 and a sliding door panel 256, slidingly displaceable between an open position (FIG. 8B) and a closed position (FIG. 8A). A motor system (not seen) associated with door system 250 is configured for linear sliding displacing the sliding door panel 256 between its respective positions, with a door module 260 configured at the lock jamb 262 of the door frame 251. Apart for the door system 250 being a sliding door system, it operates same as the hinged door arrangements.

Finally, with reference to FIGS. 9A to 9E, attention is made to a toilet stall generally designated 280, configured with six toilet cabins (identified as 1 to 6), each of which defining a confined space fitted with a respective door system according to an example of the disclosure. In the illustrations, the signaling system at the outside plate panel 56 of each cabin, namely multicolored led indicator 128, represents the situation of the respective cabin, wherein a Green light indicates the respective cabin is vacant and ready for use, a Red light indicates the respective cabin is occupied (i.e. in use), two alternatingly blinking Red lights indicate the respective cabin is out of use or required service. Obviously, other door parameters can be represented, at designer's choice.

Figure 9A:
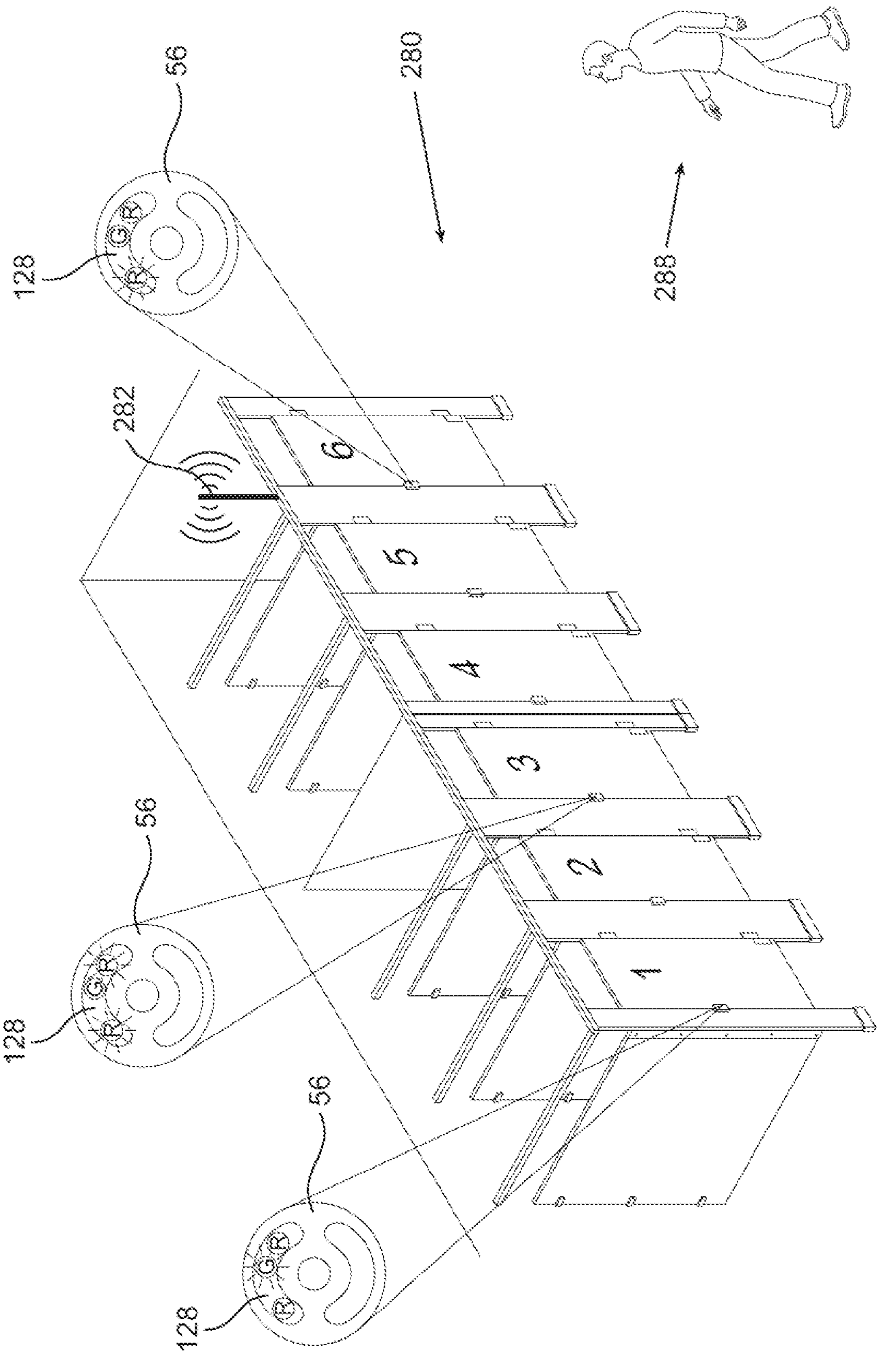
FIGS. 9A to 9E illustrate a toilet stall fitted with door systems according to the disclosure, at sequential operative positions.
Figure 9B:
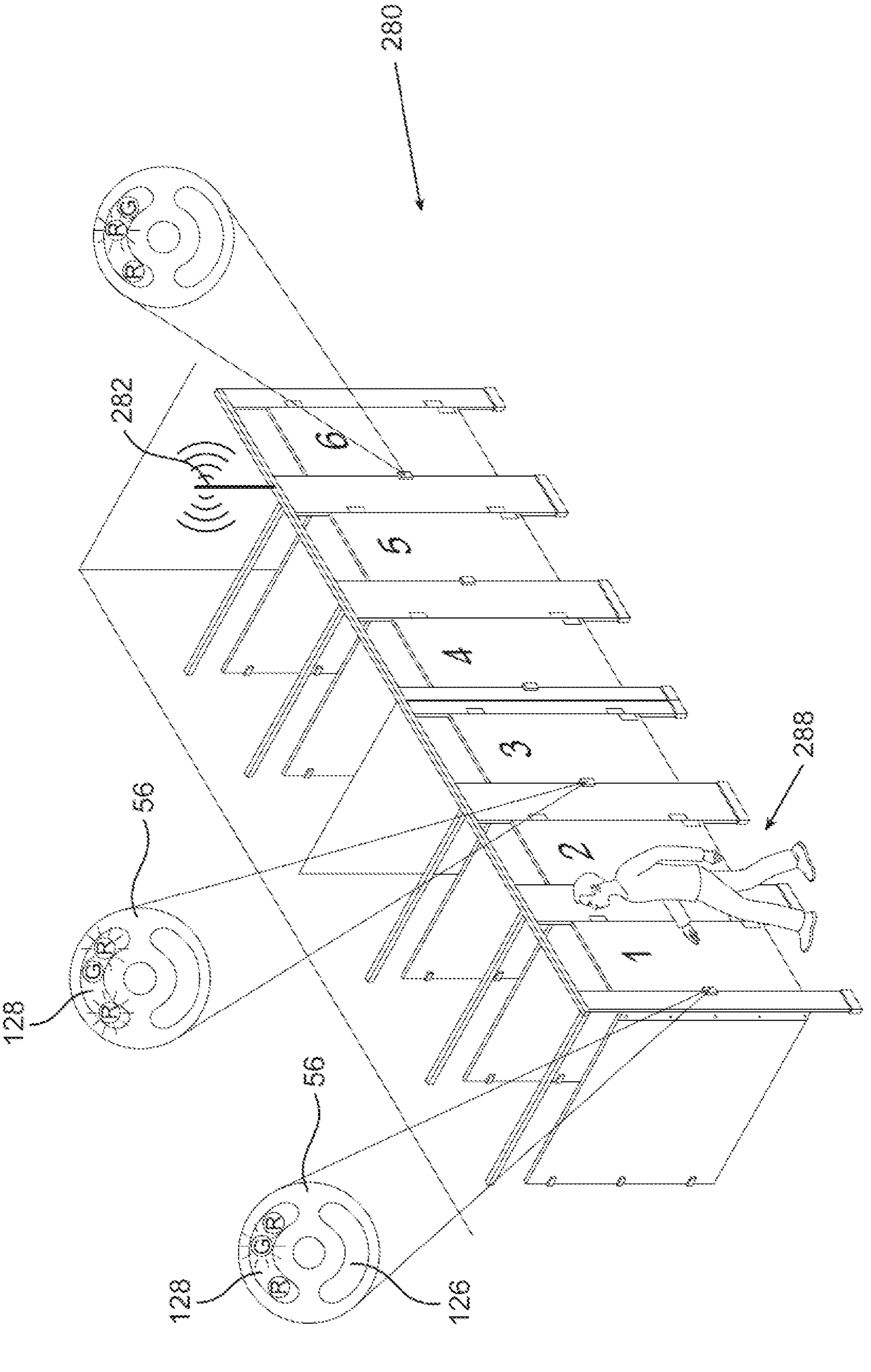

The situation illustrated in FIG. 9A represents the following situation (for sake of example only three cabins are referred to):

Toilet cabin no. 1 Green light on (cabin is ready for use);

Toilet cabin no. 3 alternatingly blinking Red lights (cabin is out of order);

Toilet cabin no. 6 Red light on (cabin is occupied);

The situation of each cabin is transmitted over Wi-Fi or any other wireless communication (282) to a central control service (not shown), so as to send a service person to attend to cabin no. 3.

Meanwhile, an individual 288 enters the toilet stall space 280, and notes that available cabins, of which he choses to enter cabin no. 1 at which the signaling system indicates that the respective cabin is ready for use. The individual 288 approaches cabin no. 1 (FIG. 9B) and nears his hand to the outside sensor 126, whereby a first signal is emitted to the control unit.

Figure 9C:
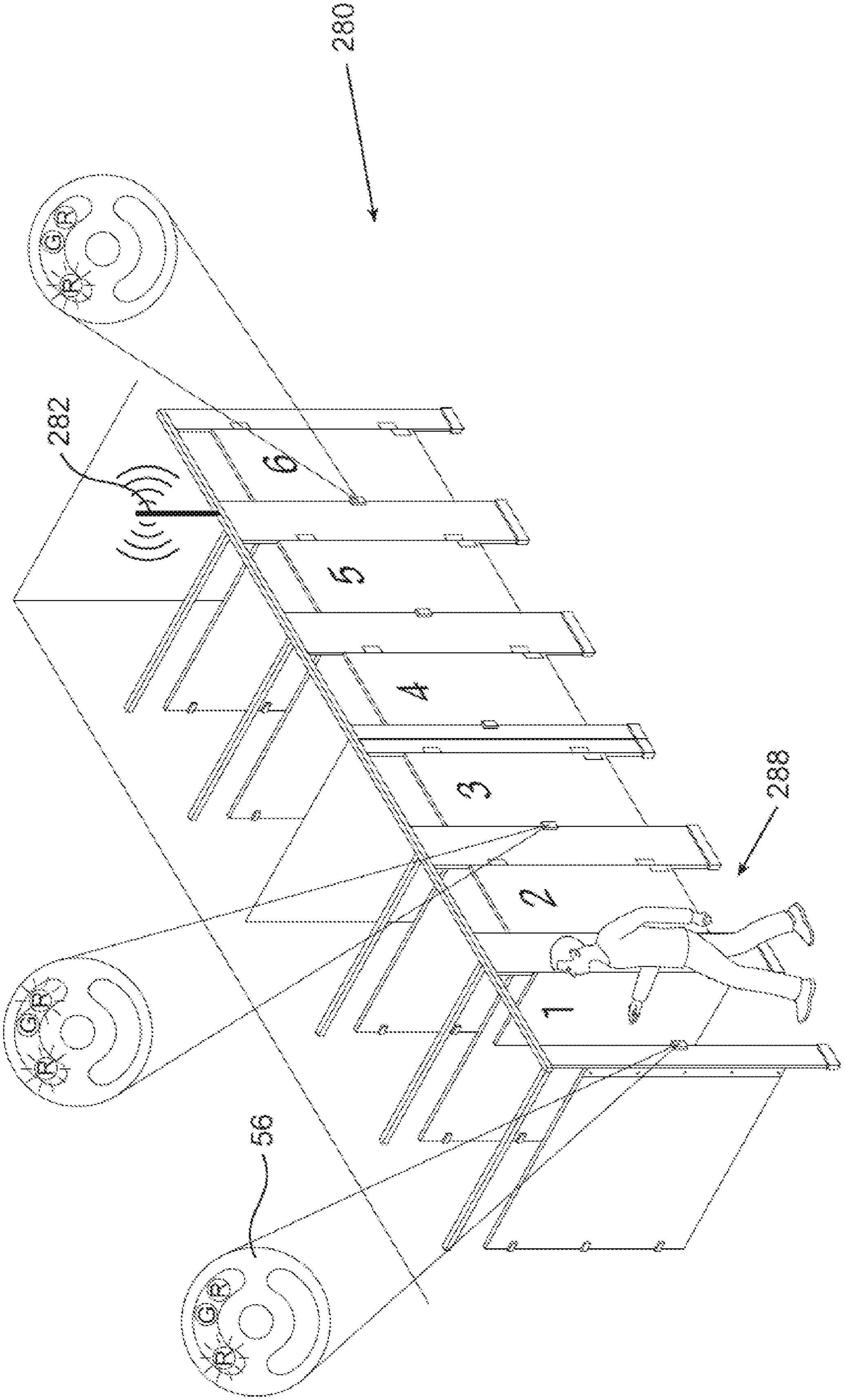
Figure 9D:
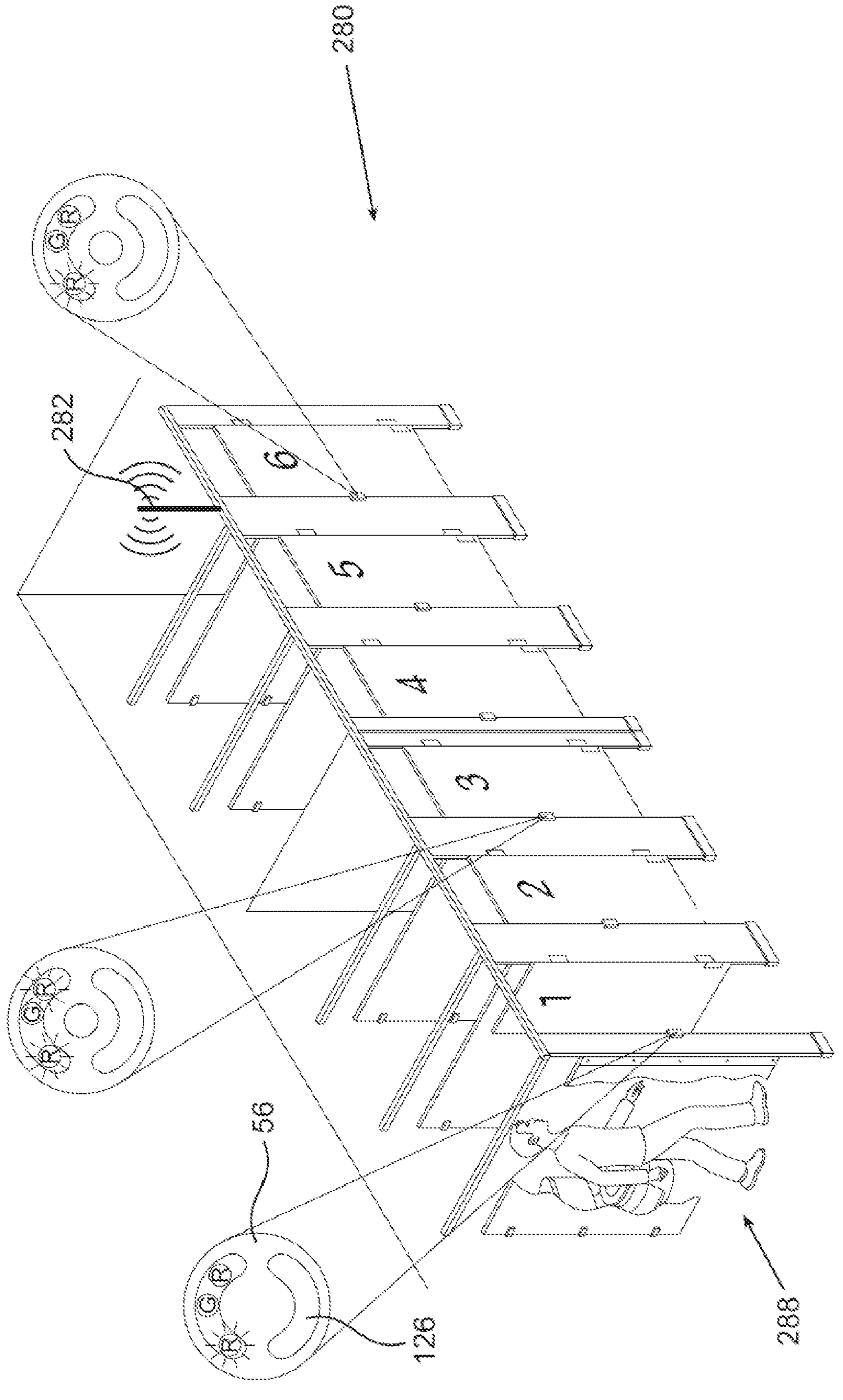

Responsive to the first signal, the controller emits an entrance signal wherein the controller generates an unlocking signal so as to unlock the locking assembly 98 and then a door opening signal is emitted by the controller to the door motor assembly 30, so as to displace the door of cabin no. 1 into the open position (FIG. 9C). The multicolored led indicator 128 now turns Red whilst the door is open and the individual 288 steps into cabin no. 1.

Figure 9E:
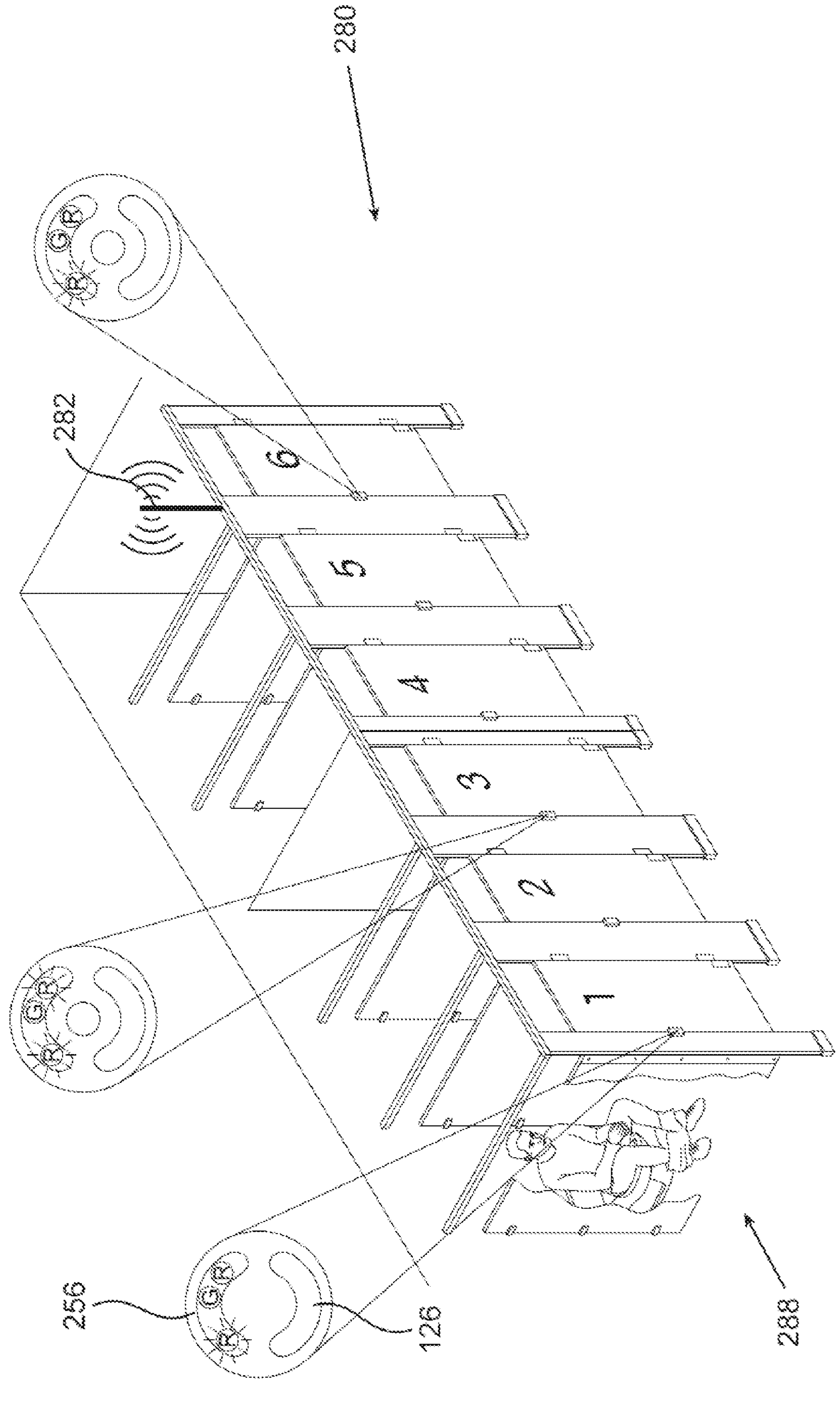

Once in the cabin, as the individual 288 turns towards the door and nears his hand towards inside sensor 132 of the control assembly (FIG. 9D), a second signal is emitted by the controller. Then, the door closing signal takes place, so that the door motor is activated to displace the door into the closed position, followed by a locking signal however after a true position of the door is received from door positioning sensor 146, whereby the locking assembly 98 displaces the deadbolt 68 into its locked position, providing the individual privacy within the confined space (FIG. 9E).

Once the individual has completed his needs within the confined space of cabin no. 1, he nears his hand to towards inside sensor 132 of the control assembly, resulting in generating an unlocking signal by the controller, such that first the locking assembly 98 displaces into the unlocked position, followed by a door opening signal issued by the controller, whereby the door motor assembly is activated to open the door of cabin no. 1, so that the individual 288 is free to walk away.

Either by the individual placing his hand near the inside sensor 132, or after a predetermined period of time (after the door has opened), the door will displace to the closed position and the locking assembly will lock the door, whereby the cabin is ready for next use and the light indicates Green (unless service is required).

Thus, it is appreciated that opening and closing of the doors is entirely touchless, and the process is carried out merely by an array of touchless sensors, wherein the door motor assembly is configured for displacing the door between the open position and the closed position, responsive to a door opening signal or a door closing signal, respectively, emitted from the control assembly; the locking assembly is configured for displacing a locking bolt between a locked position at which it is engageable with a locking strike, responsive to a locking signal emitted from the control assembly, and an unlocked position, responsive to an unlocking signal emitted from the control assembly; the control assembly comprises at least one outside sensor, at least one inside sensor, wherein an entrance signal includes a first signal received from the at least one outside sensor and a sequential second signal received form the at least one inside sensor, resulting in generating a door closing signal and an occupied signal; and an exit signal received by the at least one inside sensor resulting in generating a door opening signal; the control assembly further comprises a signaling system configured for emitting noticeable door mode indicia responsive to door parameters; and wherein at least one outside sensor and the at least one inside sensor are touchless sensors.

However, as already discussed herein above, the door module can be configured with an override system (e.g. mechanical override), facilitating unlocking the locking assembly and opening the door. This can be done form the outside and optionally from the inside, and is useful for example at the event of malfunction of the system, power failure, user-related event, etc.

As mentioned herein before, additional sensors and signals can be configured in the system. For example, upon pickup of the first signal (as the individual approaches the door), the lights can go on in the cabin, and turn off, respectively as the individual leaves. Also, a sanitizing/deodorizing/ventilating system can be activated responsive to any of the emitted signals.

The invention claimed is:

1. A door system comprising:

a door frame and a door articulated to the door frame;

a door motor assembly configured for displacing the door between an open position and a closed position, responsive to a door opening signal or a door closing signal, respectively; and a unitary touchless door module mounted within said door or within said door frame, said unitary touchless door module comprising:

a locking assembly disposed in said unitary touchless door module and configured for displacing a locking bolt between a locked position at which it is engageable with a locking strike, responsive to a locking signal, and an unlocked position, responsive to an unlocking signal;

a control assembly disposed in said unitary touchless door module and comprising an inside sensor disposed in said unitary touchless door module and configured for sensing an individual in its proximity, an outside sensor disposed in said unitary touchless door module and configured for sensing an individual in its proximity, a signaling system disposed in said unitary touchless door module and configured for emitting noticeable door mode indicia responsive to door parameters, and a controller disposed in said unitary touchless door module and configured and operable to generate:

an entrance signal responsive to a signal received by said controller from the outside sensor for the motor assembly to displace the door to the open position;

a door closing signal responsive to a signal received by said controller from the inside sensor sequentially after receipt of the signal from the outside sensor for the motor assembly to displace the door to the closed position, an occupied signal responsive to the sequential receipt of the signals from said outside and inside sensors for emitting a corresponding occupied indicia; and an exit signal responsive to a further signal received by said controller from the inside sensor for the motor assembly to displace the door to the open position.

2. The door system according to claim 1, comprising at least one door position sensor, and wherein the locking signal is generated upon sensing a closed position generated by the at least one door position sensor.

3. The door system according to claim 1, wherein the control assembly further comprises a communication module configured for transmitting data regarding door parameters to a remote location.

4. The door system according to claim 1, wherein the door motor assembly is configured for at least one of the following: to be disposed at an inside or an outside of the door; to be fitted within the door or within the door frame; to comprise a motor unit fixed to one of the door and the frame with a respective manipulating member extending from the motor unit to the other one of the door and the frame; to comprise a clutch mechanism configured to discontinue displacing the door between its respective position at the event of an obstacle disposed at the door's path of displacement; and/or to use a sensing arrangement for determining motor position and transmitting motor indicia to the control assembly.

5. The door system according to claim 1, wherein the unitary touchless door module is configured at a lock jamb or at a lock stile.

6. The door system according to claim 1, wherein a fee charging module is configured, wherein the door will open conditional to fee transmittal.

7. The door system according to claim 1, wherein the door mode indicia is at least one of the following: an audio indicia; an indication displayed at either or both of an outside and an inside of the door; a visible indicia; a light emitted signal displayable at a door handle height.

8. The door system according to claim 1, wherein at a standby position the door is in one of the following states: a normally closed and locked, a closed unlocked position, or closed unlocked position with the door motor being disconnected.

9. The door system according to claim 4, wherein a locking strike is configured at a lock stile of the door or with a lock jamb of the door frame.

10. The door system according to claim 1, wherein the system further comprises an occupied sensor configured to sense the presence of an individual within a confined space and generate a respective occupied signal, and wherein the controller is configured such that it does not generate a door open signal open as long as an occupied signal is received.

11. A unitary touchless door module for use with a door system comprising a door frame and a door articulated to the door frame and mechanically coupled to a door motor assembly configured for displacing the door between an open position and a closed position, responsive to a door opening signal or a door closing signal, respectively, wherein the unitary touchless door module is mounted within said door or within said door frame and comprising:

a locking assembly disposed in said unitary touchless door module and configured for displacing a locking bolt between a locked position at which it is engageable with a locking strike, responsive to a locking signal, and an unlocked position, responsive to an unlocking signal;

a control assembly disposed in said unitary touchless door module and comprising at least one inside sensor disposed in said unitary touchless door module and, at least one outside sensor disposed in said unitary touchless door module and, a signaling system disposed in said unitary touchless door module and configured for emitting noticeable door mode indicia responsive to door parameters, and a controller disposed in said unitary touchless door module and configured and operable to generate: an entrance signal responsive to a signal received by said controller from the at least one outside sensor for the motor assembly to displace the door to the open position; a door closing signal responsive to a signal received by said controller from the at least one inside sensor sequentially after receipt of the signal from the outside sensor for the motor assembly to displace the door to the closed position, an occupied signal responsive to the sequential receipt of the signals from said outside and inside sensors for emitting a corresponding occupied indicia; and an exit signal responsive to a further signal received by said controller from the at least one inside sensor for the motor assembly to displace the door to the open position.

12. The unitary touchless door module according to claim 11, further comprising at least one door position sensor, and wherein the locking signal is generated upon sensing a closed position generated by the at least one door position sensor.

13. The unitary touchless door module according to claim 11, wherein the control assembly further comprises a communication module configured for transmitting data regarding door parameters to a remote location.

14. The unitary touchless door module according to claim 11, wherein the locking assembly comprises a manual override mechanism, configured for manipulating the locking assembly between its respective positions.

15. The unitary touchless door module according to claim 14, wherein the manual override mechanism is configured at any one or both of the inside and outside of the door module.

16. The unitary touchless door system according to claim 11 configured for fitting at a lock jamb or at a lock stile.

17. The unitary touchless door module according claim 11, wherein the locking signal is emitted by a time relay configured for closing the door after a predetermined time has lapsed from generation of the door opening signal.

18. The unitary touchless door module according to claim 11, wherein the unlocking signal is configured to distinguish authorization for entry into a confined space to particular individuals.

19. The unitary touchless door module according to claim 11, further comprising an occupied sensor configured to sense the presence of an individual within a confined space and generate a respective occupied signal.

20. The unitary touchless door module according to claim 11, wherein the controller is configured such that it does not generate a door open signal open as long as an occupied signal is received.

21. The unitary touchless door module according to claim 11, wherein a timer is configured for generating a door closing signal after a predetermined time has lapsed from opening the door.

22. The unitary touchless door module according to claim 11, configured for retrofit at existing door systems.

* * * * *